May 4, 1937.   M. C. McM. O'BRIEN   2,079,130
APPARATUS FOR ENCIPHERING AND DECIPHERING MESSAGES
Filed March 25, 1936   17 Sheets-Sheet 1

INVENTOR

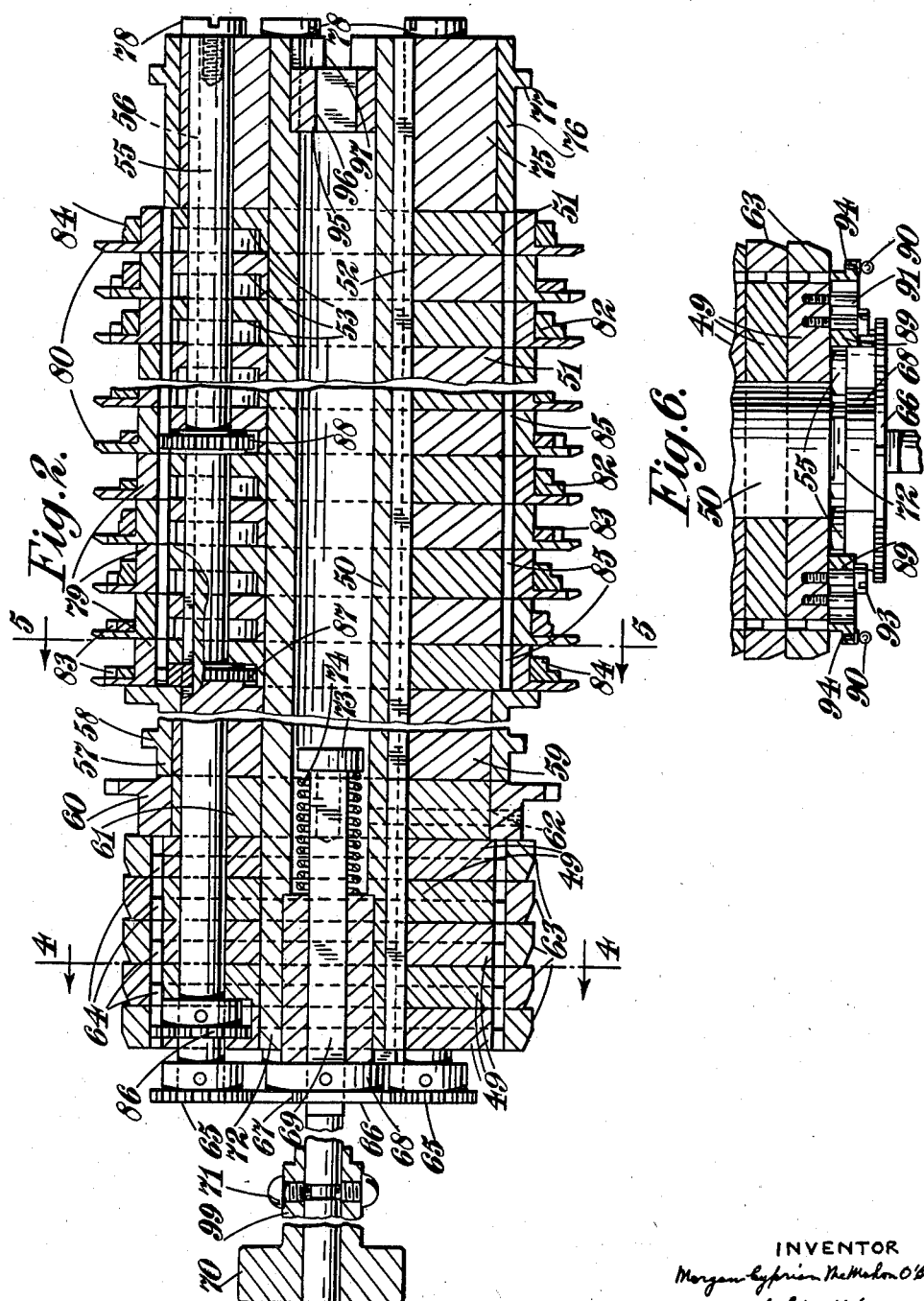

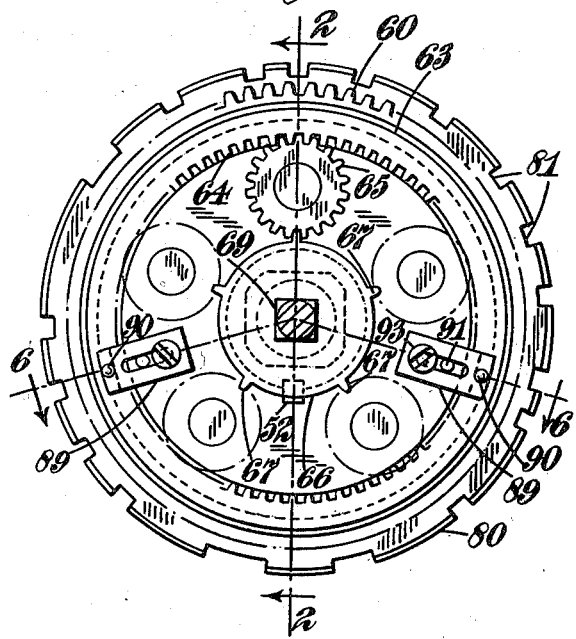
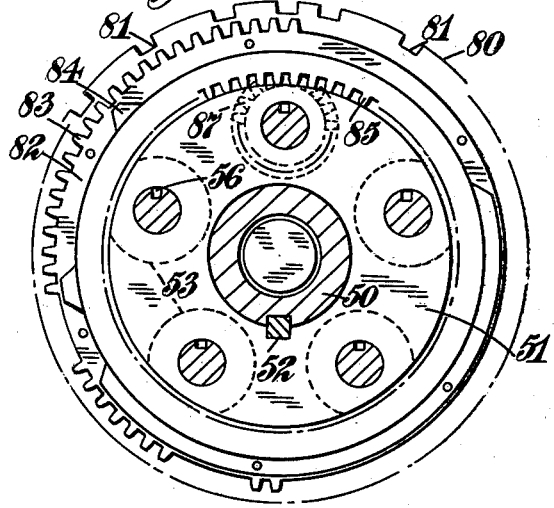
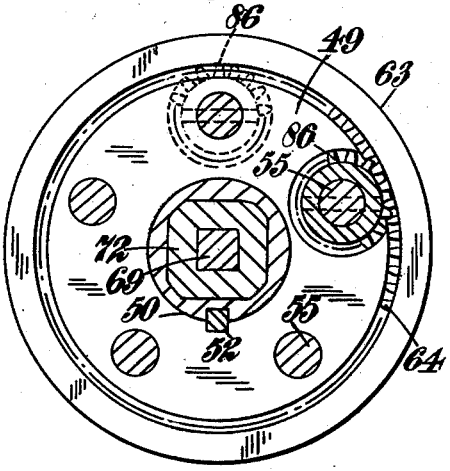

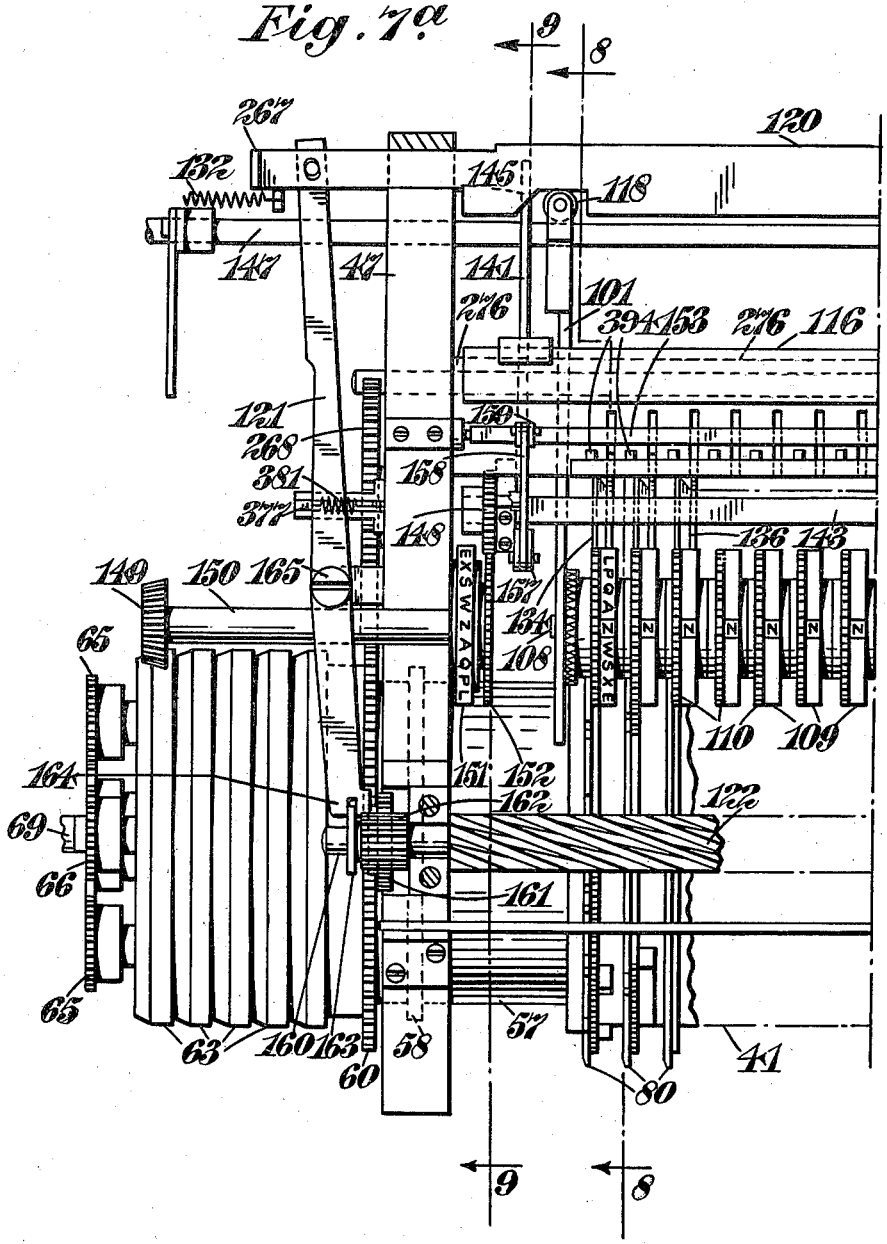

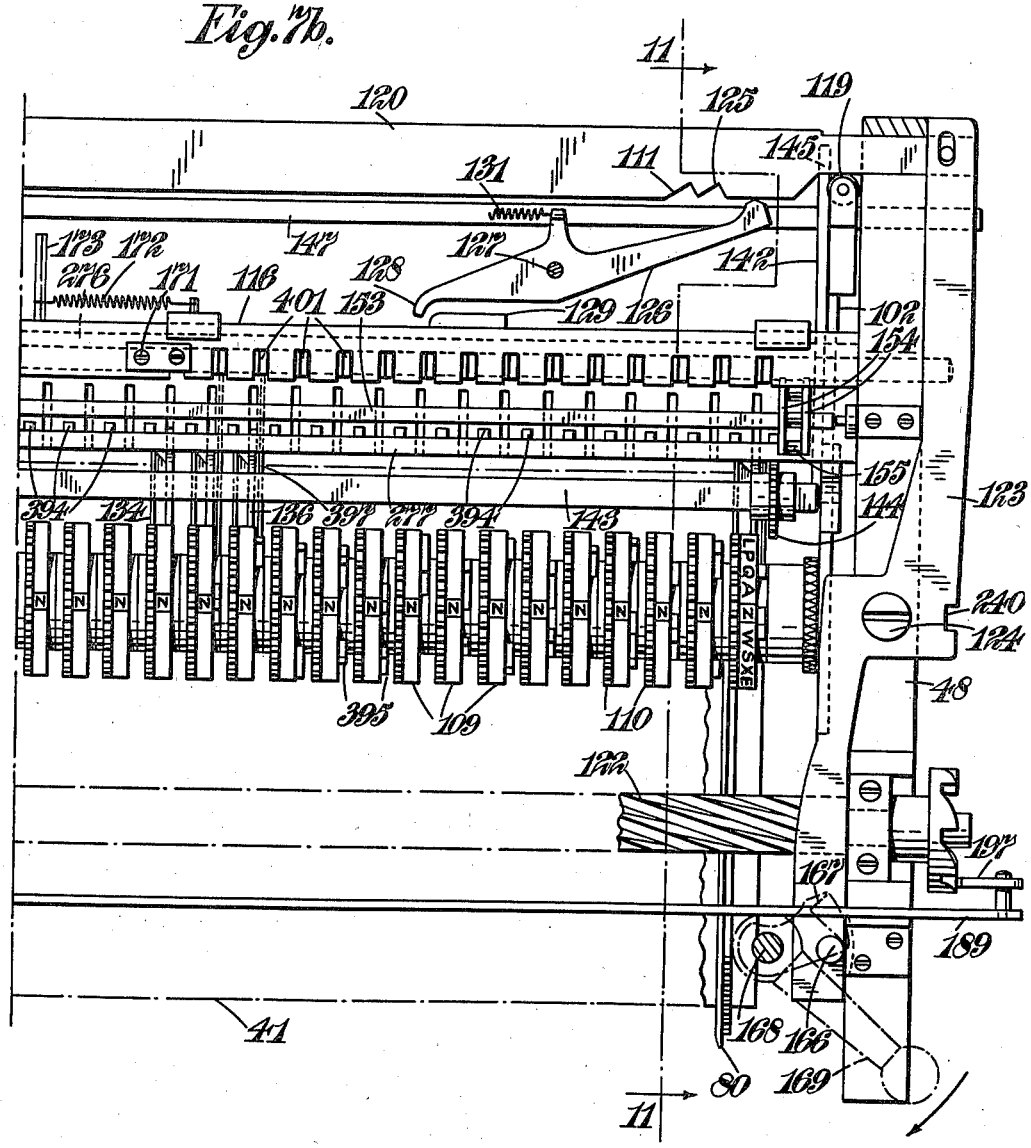

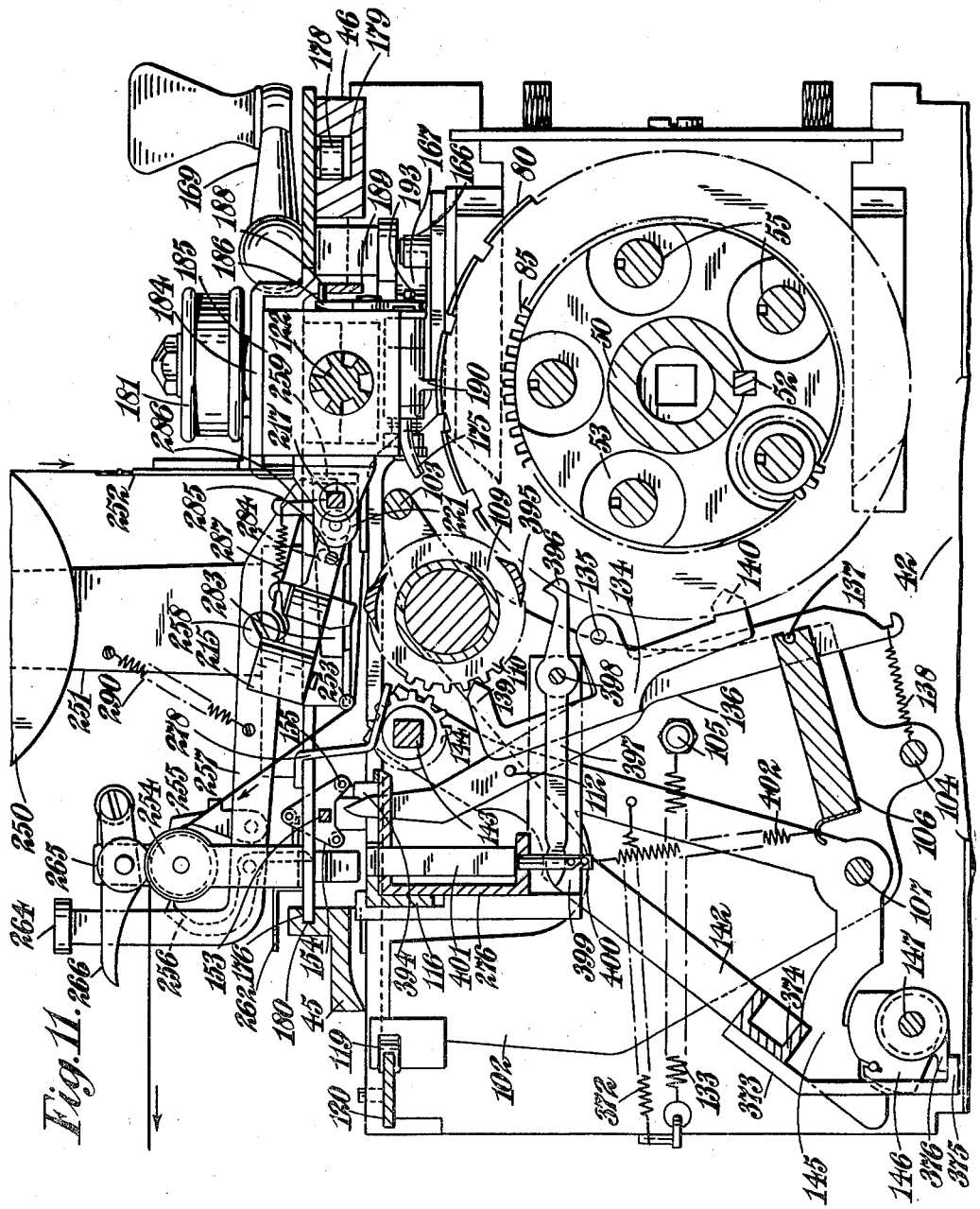

May 4, 1937.  M. C. McM. O'BRIEN  2,079,130
APPARATUS FOR ENCIPHERING AND DECIPHERING MESSAGES
Filed March 25, 1936  17 Sheets-Sheet 10
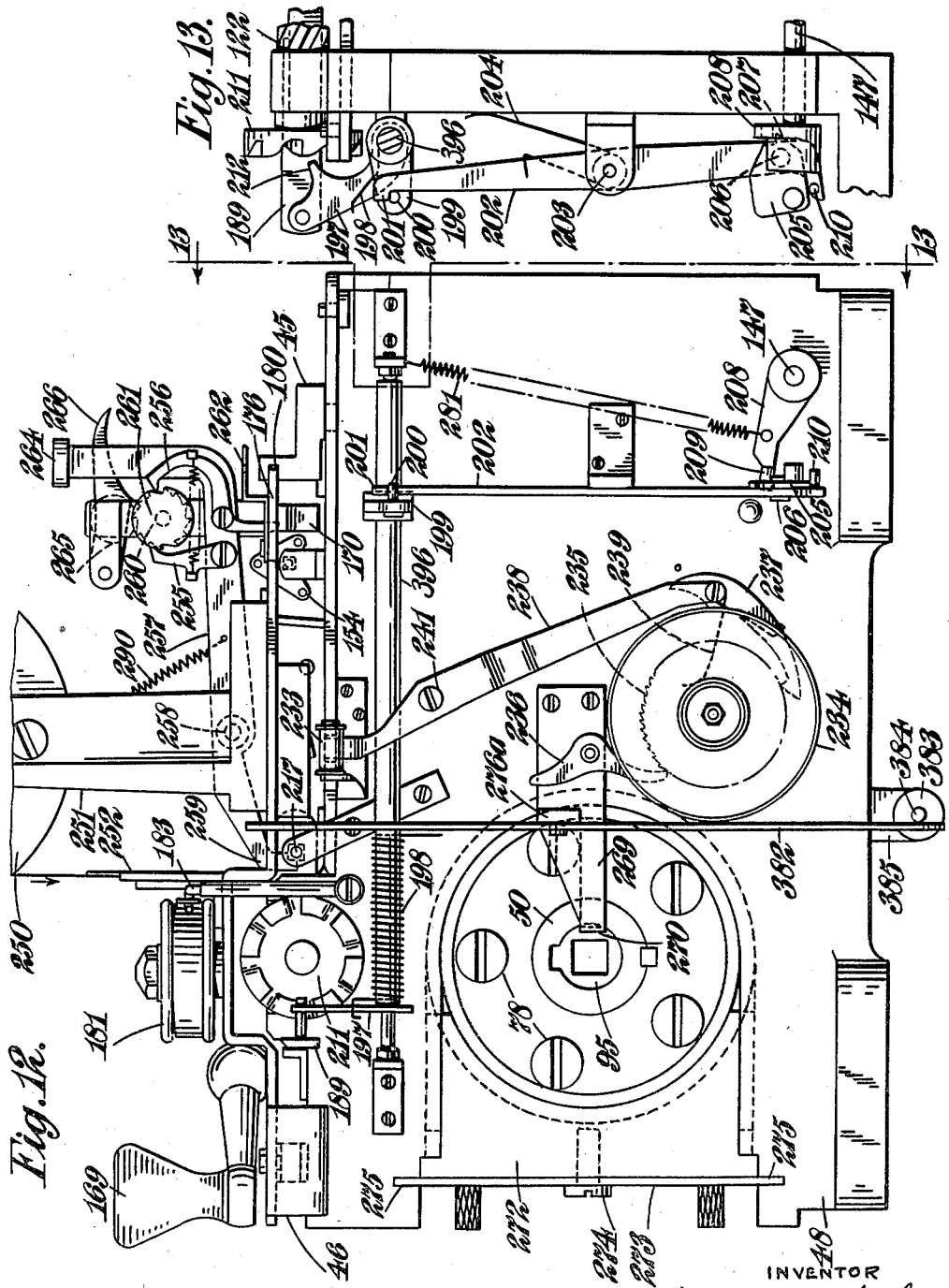
INVENTOR
Morgan Cyprien McMahon O'Brien
by his attys
Stebbins, Blenko & Parmelee May 4, 1937.  M. C. McM. O'BRIEN  2,079,130
APPARATUS FOR ENCIPHERING AND DECIPHERING MESSAGES
Filed March 25, 1936  17 Sheets-Sheet 11

INVENTOR
Morgan Cyprian McMahon O'Brien
by his attys
Stebbins, Blenko & Parmelee

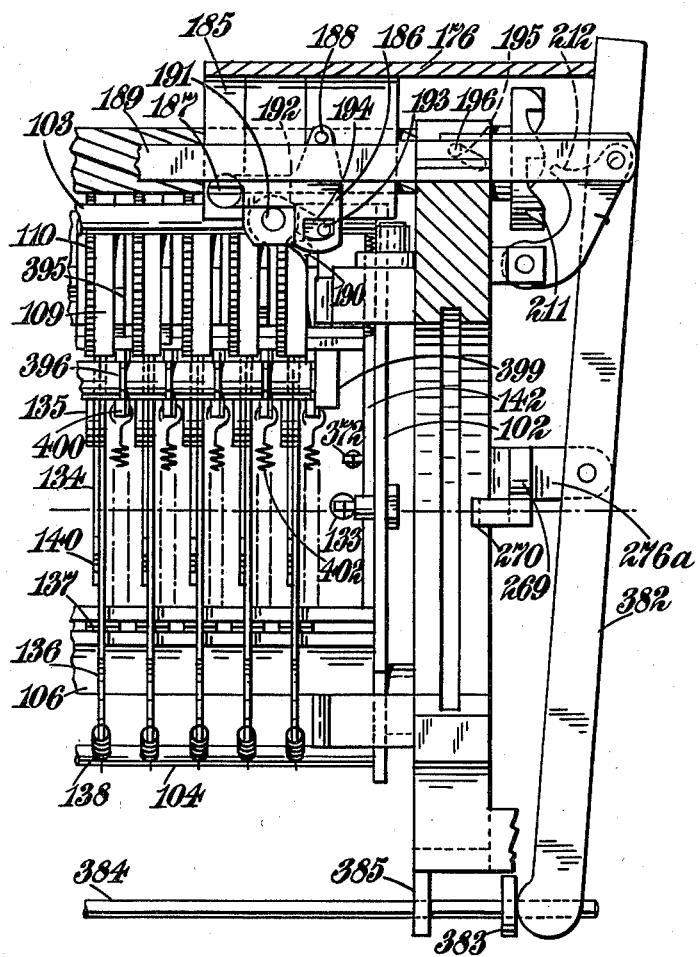

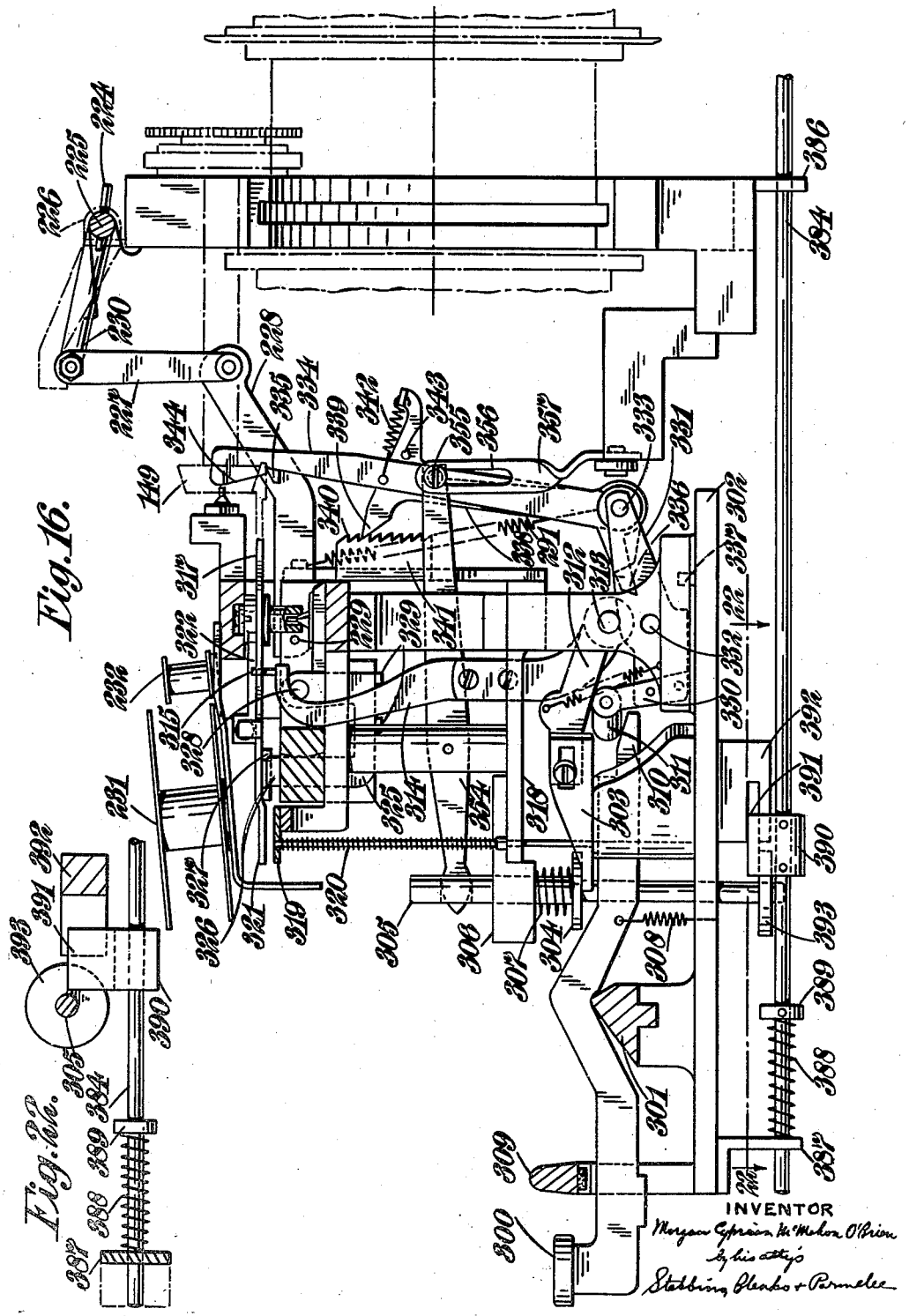

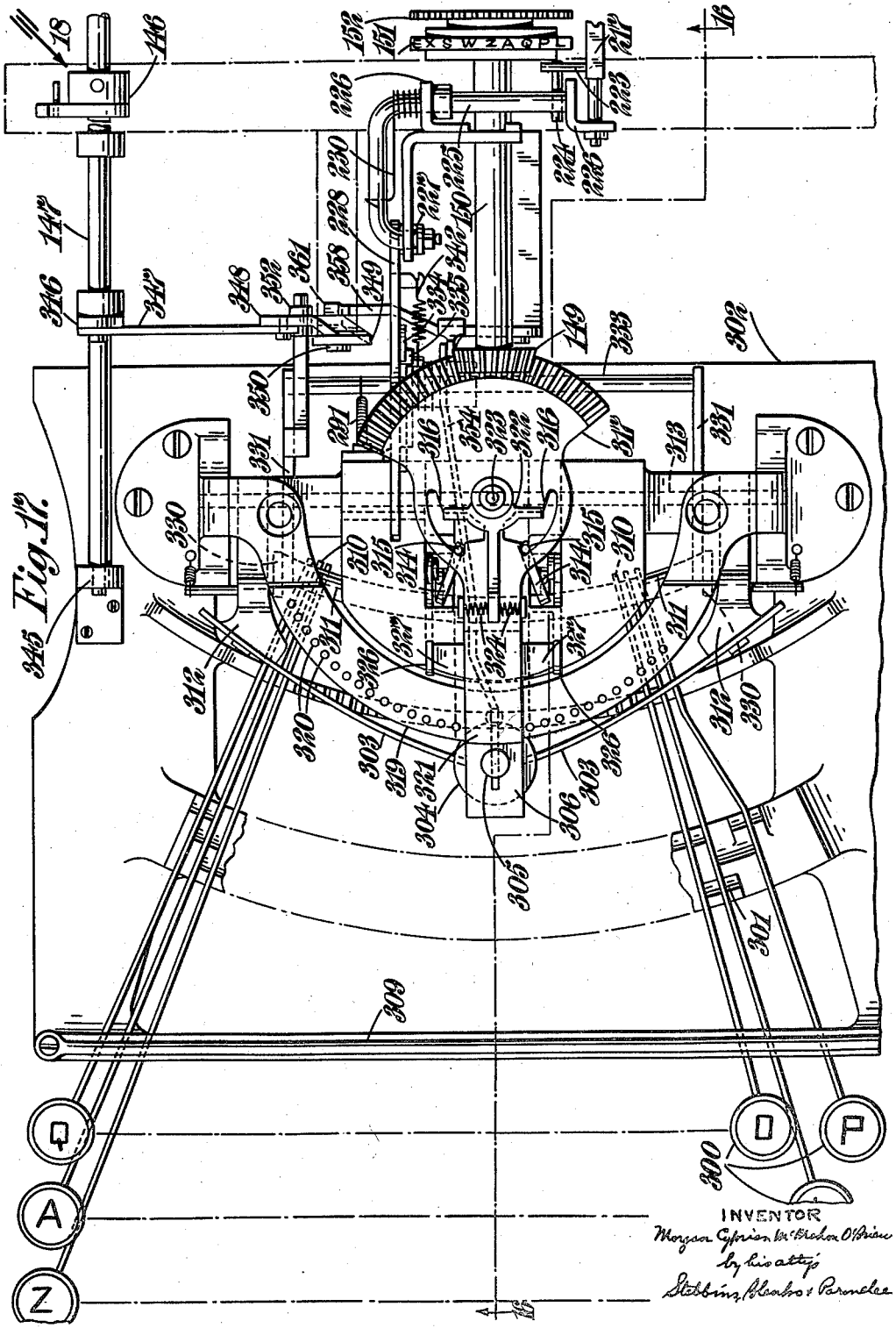

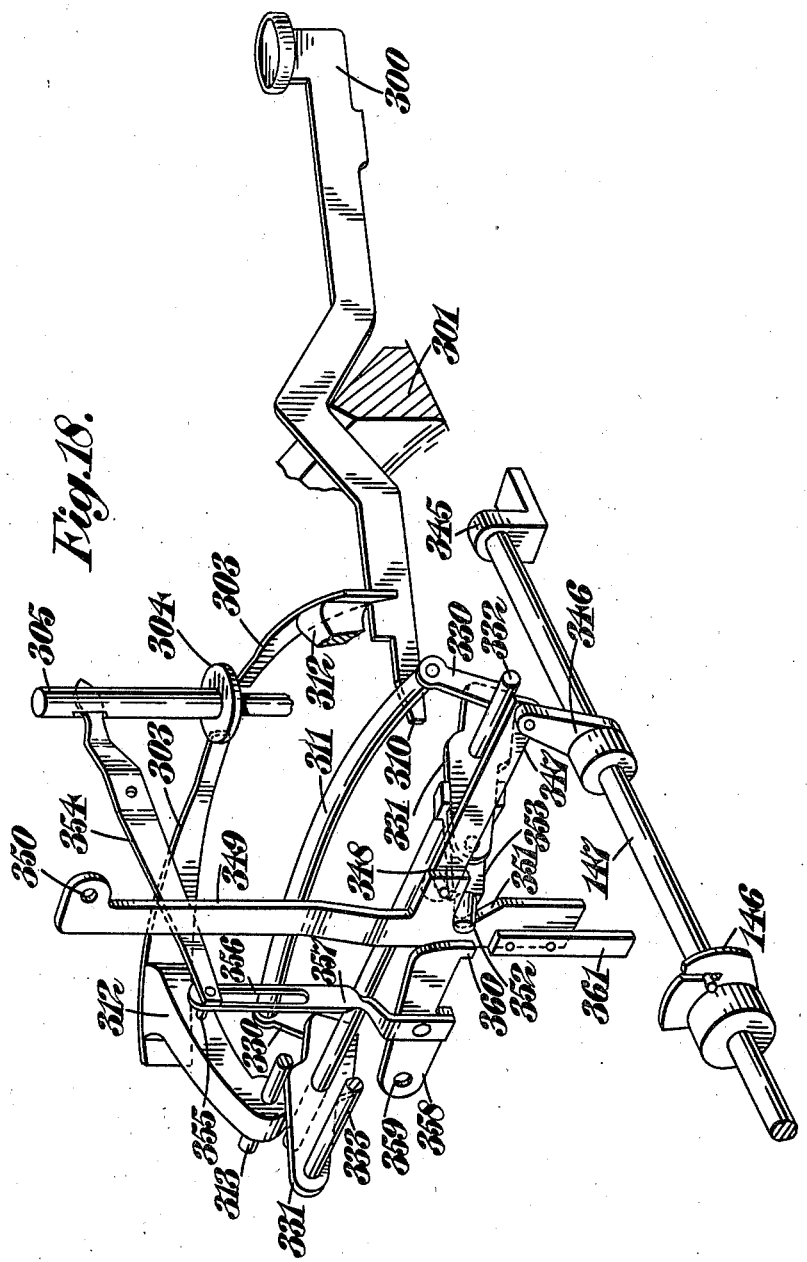

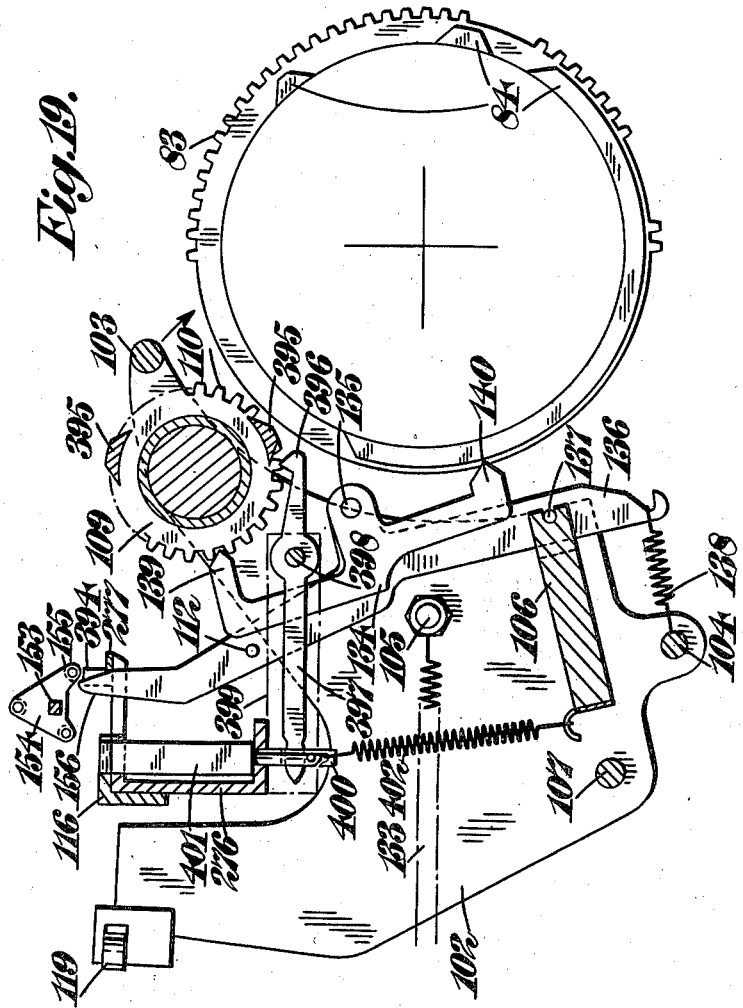

May 4, 1937. M. C. McM. O'BRIEN 2,079,130
APPARATUS FOR ENCIPHERING AND DECIPHERING MESSAGES
Filed March 25, 1936   17 Sheets-Sheet 17
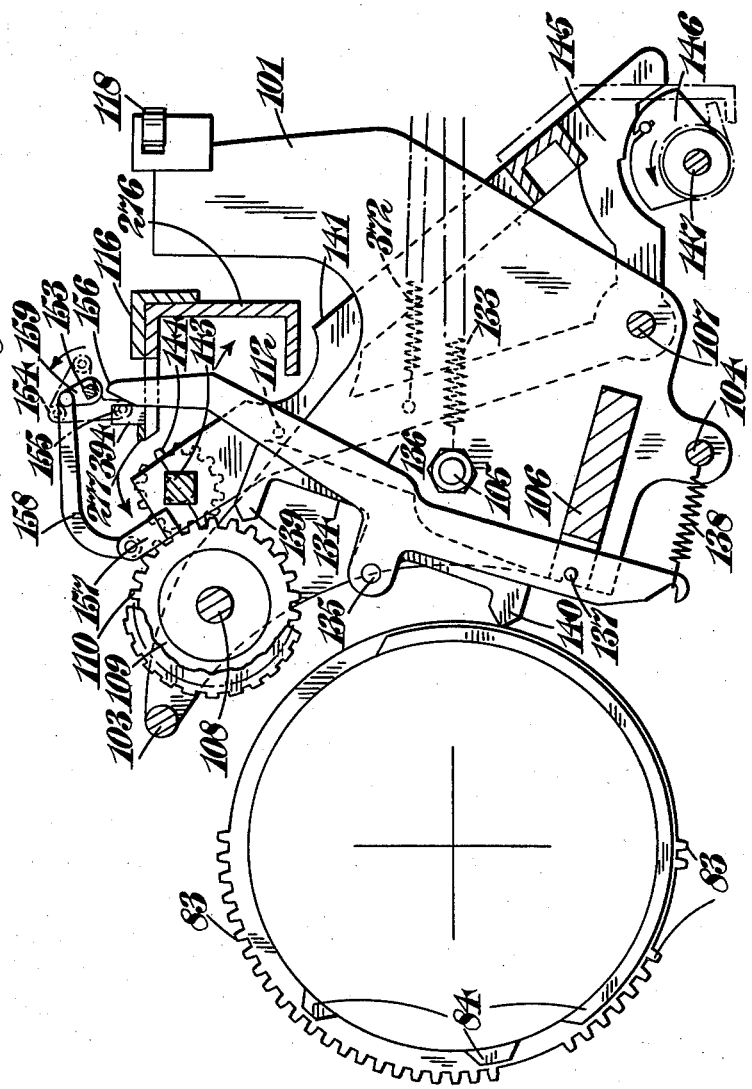
INVENTOR Patented May 4, 1937

2,079,130

UNITED STATES PATENT OFFICE 2,079,130

APPARATUS FOR ENCIPHERING AND DECIPHERING MESSAGES

Morgan Cyprian McMahon O'Brien, Shortlands, England

Application March 25, 1936, Serial No. 70,905
In Great Britain April 3, 1935

20 Claims. (Cl. 197—4)

This invention is for improvements in or relating to machines for enciphering and deciphering messages of the kind in which a plurality of typewheels (herein termed "cipher-wheels") each carrying an alphabet or other set of characters on its periphery, are arranged co-axially and are traversed by a carriage which moves longitudinally of the cipher-wheel axis. The machine comprises means for rotating the cipher-wheels relatively to one another so as to change the cipher, (which operation is herein termed "scattering"), during each longitudinal movement of the carriage in one direction. The carriage executes two movements alternately during the operation of the machine;

(1) A traversing movement during which typing keys are operated and the message is printed from certain of the cipher-wheels; this movement of the carriage is herein termed the "typing run"; and (2) A movement during which the carriage is returned to a position from which the next typing run commences; this movement is herein termed the "return movement".

As is explained hereinafter, the return movement of the carriage is operative to scatter the cipher-wheels to a new setting and to effect various operations automatically; no printing from the cipher-wheels takes place during the return movement.

A cipher machine according to the present invention is similar in its principle of operation to that described in United States Patent No. 2,046,276. In this prior invention the typing movement of the carriage takes place during the rearward travel of the carriage from the front to the back of the machine and the return movement is from the back to the front of the machine, although this arrangement might be reversed.

An object of the present invention is to provide a machine of this general kind in which the various automatic operations, which take place during the enciphering and typing of a message to be sent, or during the deciphering of a message which has been received, are inter-related so that they cannot fail to take place in the proper order, and so that the possibility of disturbance of the cipher sequence owing to inadvertence on the part of the operator is eliminated. A further object is to provide a higher standard of mechanical perfection of the kind of machine described.

According to one feature of the present invention the cipher-whels are aranged so as to be selectively engaged by a selector wheel by which the cipher-wheel so engaged is rotated through an angle corresponding to the particular typing key which has been depressed. The cipher-wheel is provided with a detent which prevents it from rotating except when it is engaged by the selector-wheel, and a detent-removing member actuated from the typing keys operates to remove the detent at the instant of engagement of the selector-wheel with the cipher-wheel and to replace it at the instant of disengagement.

During typing it is necessary for the following operations to take place every time a typing key is depressed and released:—

(1) The selector-wheel must be engaged with a cipher-wheel;

(2) The selector-wheel must be rotated so as to rotate that cipher-wheel through an angle corresponding to the particular key depressed;

(3) The hammer must be actuated to effect printing from that cipher-wheel;

(4) The selector-wheel must be rotated in the reverse direction so as to return the cipher-wheel to its initial position;

(5) The selector-wheel must be disengaged from the cipher-wheel with which it was in engagement;

(6) The movable carriage must be moved from its position of register with one cipher-wheel to a position of register with another cipher-wheel.

The necessity for these operations and for their being inter-related so as necessarily to occur in the proper order will be obvious from the more detailed description of the machine hereinafter given. Moreover, it will be appreciated that each of the single operations above described carries with it ancillary operations. For example the intermeshing of the selector-wheel with one of the cipher-wheels, by rocking the frame carrying the selector-wheel, removes the cipher-wheel detent; the travel of the carriage from one position of register to the next automatically ensures that it shall be arrested in the next position (although, as hereinafter explained, the "next" position is not necessarily the position in register with the next cipher-wheel). However, such ancilary operations require no separate timing mechanism since, by the nature of the parts employed, they are incapable of taking place except at their proper times.

Another feature of the present invention consists in preventing the typing keys from being operated when the movable carriage has reached the end of the typing run and has not been returned. This is necessary as, otherwise, it would be possible for the operator inadvertently to type two letters or other characters from the same cipher-wheel (i. e. the last cipher-wheel).

Another feature of the invention consists in the form or construction of the scatter-drum which is very much simplified although its function and usefulness are extended, as compared with the apparatus described in the prior specification aforesaid.

The typing mechanism used, according to the present invention, is a modification of that known as the Hammond mechanism in which a quadrant is selectively rotated by the typing keys and its movement is arrested by a locating pin appropriated to that key and projected into the path of a part of the quadrant. In an ordinary Hammond typewriter the quadrant carries a type-shuttle but this shuttle is not required in a machine according to the present invention and is replaced by a gear-drive through which the selector-wheel is actuated.

At the completion of the operation of typing a character it is necessary, with a machine according to the present invention, that the Hammond quadrant should return to its initial position, otherwise there would be nothing to ensure that the selector-wheel would engage accurately with the cipher-wheel when the selector-wheel-frame is rocked at the beginning of the next key movement. Location of the Hammond quadrant for this purpose is effected by a dog which is projected into the path of a tail portion of the quadrant so as to arrest its return movement. Rebound from this dog is prevented by a second dog which is projected into the path of the said tail on the other side of it. The said dogs are actuated by the existing quadrant-driving levers of the Hammond mechanism.

An essential feature of a machine of the kind described is the operation which occurs during the return movement of the carriage, of intermeshing the cipher-wheels with the mutilated gears of the scatter-drum. In the present invention this is accomplished by rocking a sub-frame carrying the cipher-wheels towards a scatter-drum mounted to rotate about a fixed axis.

As in the prior specification above referred to, the carriage moves in a series of irregular steps during the typing movement, and according to the present invention, these steps are controlled by flanges on the scatter-gears, the flanges being formed with gaps or notches distributed around them in an irregular and arbitrary fashion.

The carriage may also experience a varying travel during the return movement. This is achieved, according to the present invention, by movable stops which are projected into the path of an abutment on the carriage by cams carried on some or all of the cipher-wheels and operative during the return movement.

A specific embodiment of the present invention will now be described, by way of example, with reference to the accompanying drawings of which:—

Figure 1 is a perspective view of the complete machine showing the general arrangement of the parts, Figure 2 is a longitudinal section through the scatter-drum, taken on the line 2—2 of Figure 3, Figure 3 is a front view of the scatter-drum with the operating knob removed, Figure 4 is a section on the line 4—4 of Figure 2, Figure 5 is a section on the line 5—5 of Figure 2, while Figure 6 is a sectional plan of the front end of the scatter-drum taken on the line 6—6 of Figure 3, Figure 7a is a plan view of the front portion of the main body of the machine with the keyboard mechanism and numerous other parts omitted for clearness, Figure 7b is a plan view of the rear portion of the main body of the machine with parts omitted for clearness, Figure 8 is a section on the line 8—8 of Figure 7a.

Figure 9 is a section on the line 9—9 of Figure 7a.

Figure 11 is a section on the line 11—11 of Figure 7b.

Figure 12 is an elevation of the rear end of the machine,

Figure 13 is a view of certain details looking on the line 13—13 of Figure 12,

Figure 15 is a sectional elevation taken on the line 15—15 of Figure 14,

Figure 9:
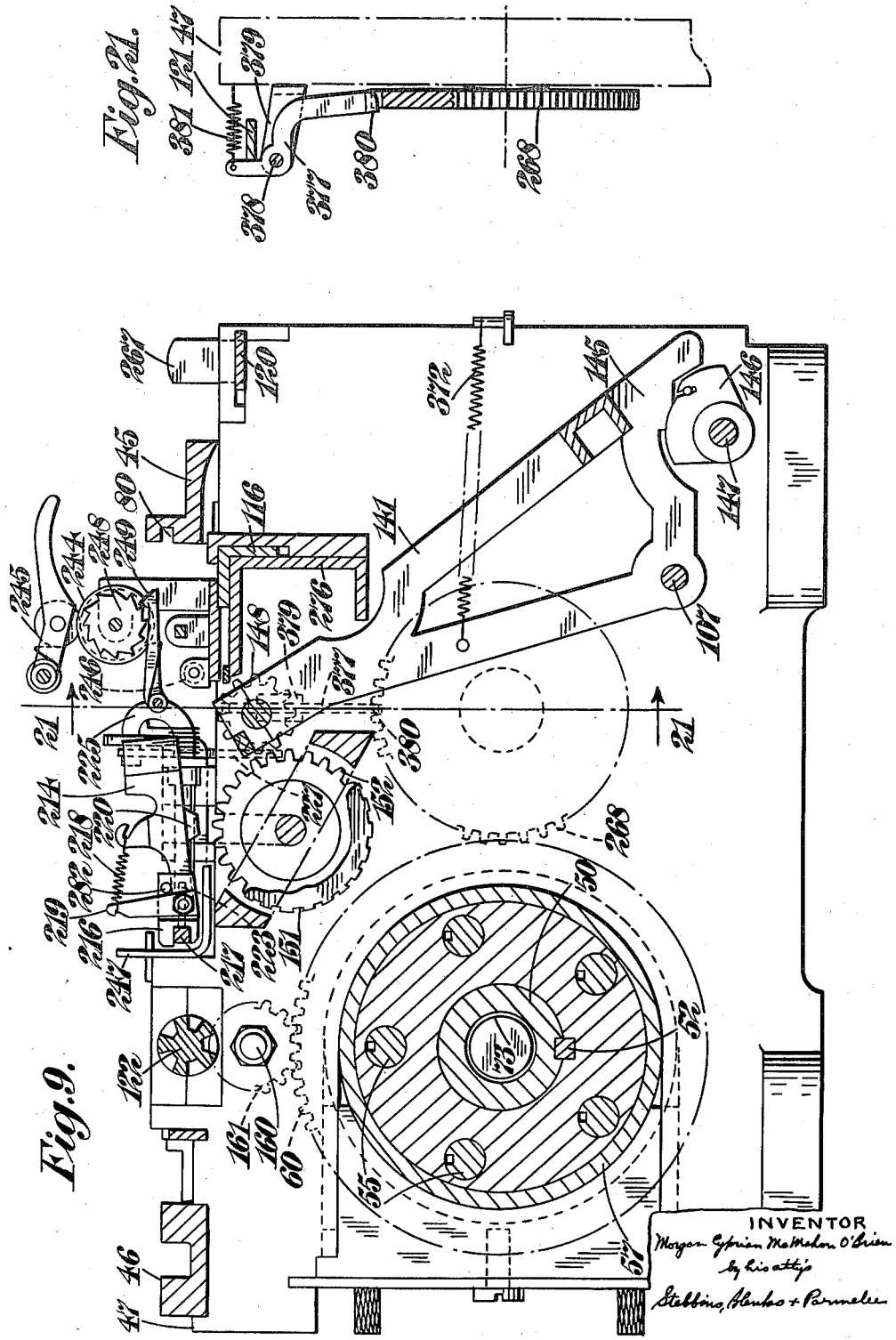

Figure 16 is a sectional elevation of the keyboard mechanism, taken on the line 16—16 of Figure 17, Figure 17 is a plan corresponding to Figure 16, Figure 18 is a perspective view of certain of the parts in the keyboard mechanism looking in the direction of the arrow 18 in Figure 17, Figure 19 is a view showing the cipher-wheel sub-frame moved into its position of engagement with the scatter-drum, Figure 20 is a view showing the selector-wheel sub-frame moved into its position of engagement with the cipher-wheels, Figure 21 is a detail elevation taken on the line 21—21 of Figure 9, and Figure 22 is a detail plan taken on the line 22—22 of Figure 16.

Figure 1:
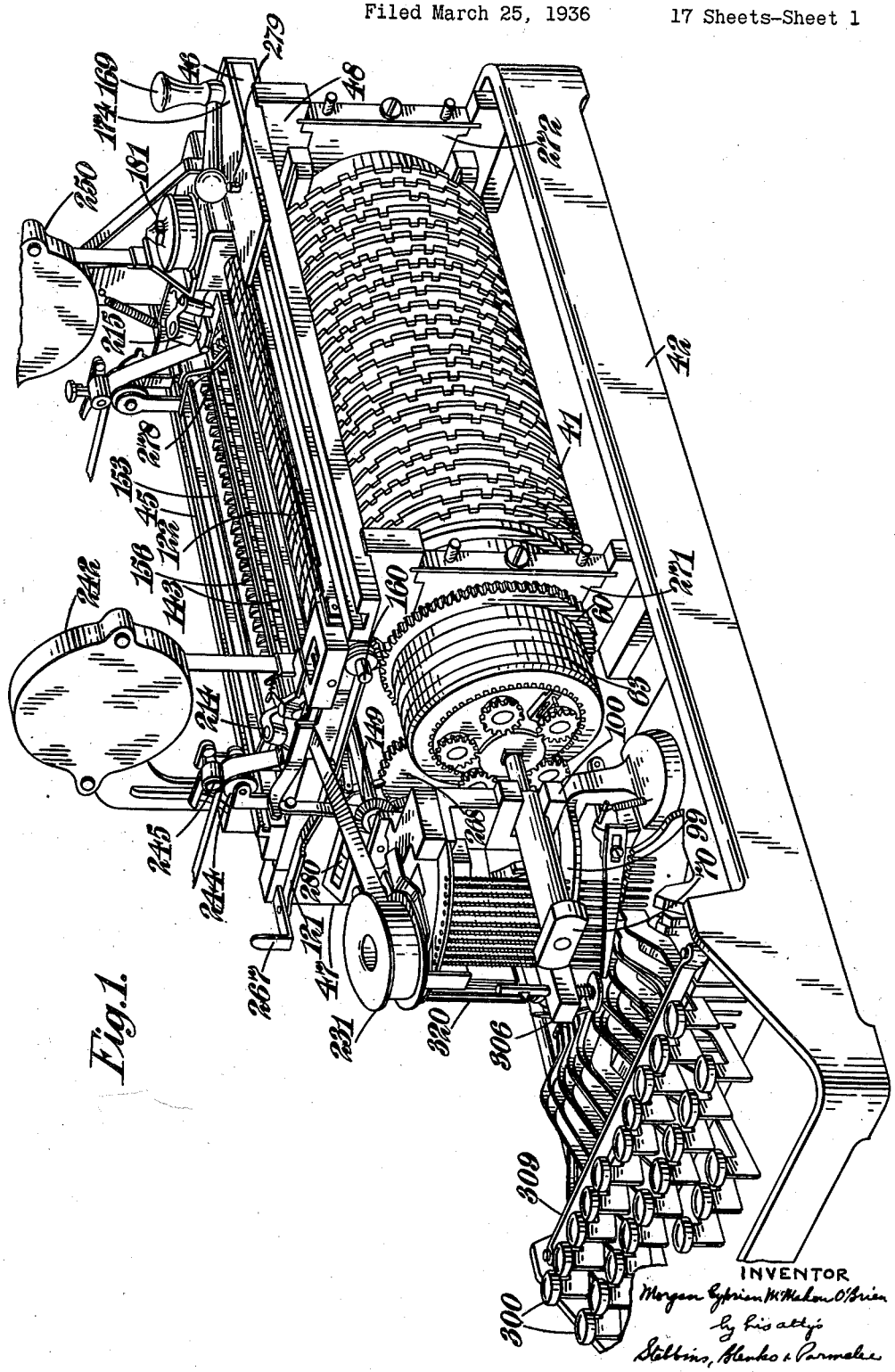

As shown in Figure 1 the machine is similar in general arrangement to the machine described in United States Letters Patent No. 2,046,276. It comprises a main supporting frame 42 having upright frame-members 47 and 48 interconnected by longitudinal frame-members 45 and 46. At the front of the machine there are the typing keys 300 upon the actuation of which a message in plain language is printed on a strip of paper fed from a cylindrical container 242. At the same time the message is printed in cipher on a strip of paper fed from the container 250 which is carried on the movable carriage 174.

At the end of each typing run of the carriage, (which is from the front to the back of the machine), the operator grasps the knob 169 and draws it towards him, whereby the carriage is returned to the front of the machine in readiness for the next typing run. During the return movement, the carriage drives a worm 122 which drives a scatter-drum indicated generally in Figure 1 by the reference 41; rotation of the scatter-drum redistributes cipher-wheels arranged along the machine to a new setting in readiness for the next typing run.

The various parts of the machine are described below in detail with reference to Figures 2 to 22 of the accompanying drawings, but the location of any important part in the assembled machine will be understood by reference to Figure 1.

The scatter-drum

As shown in Figures 2 to 6, the scatter-drum comprises a tubular shaft 50 of metal having a number of discs 51 stacked along it and keyed against rotation with respect to it by a key 52 running the entire length of the shaft and engaging a key-way in it. (See Figure 2). The discs 51 are circular and each is formed with five circular depressions 53 at the front. These depressions accommodate pinions as hereinafter described.

Running from one end of the scatter-drum to the other are five pinion-shafts 55 each having a key-way 56 formed in it. The foremost disc 51 abuts against a metal bushing 57 having a radial flange 58 for engagement with a bearing support hereinafter described. The space inside the bushing 57 (see Figure 2) is occupied by a disc 59, of which the front face together with the ring 57 abut against an annular gear-wheel 60 mounted on a disc 61 and locked against rotation with respect to the shaft 50 by means of a screw 62 passing through the annular gear 60 and the disc 61.

In front of the gear-wheel 60 there are five annular setting-dials 63 each of which is formed with internal gear-teeth 64, which teeth, however, occupy only half the width of the dial, the rear half of the internal surface of each dial being plain. The setting-dials 63 are rotatable on discs 49 which are formed with depressions in a manner similar to the discs 51, to accommodate pinions 86 (described below), with the difference that only one recess need be provided on the face of each of the discs 49.

The front end of each pinion-shaft 55 carries a gear 65 pinned to it and projecting from the forward end of the drum as shown in Figure 2. The gears 65 are adapted to be engaged by a locking-plate 66 which is formed with five single teeth 67 to engage the gears, and which carries an integral boss 68 pinned to a square shaft 69 which projects forwardly from the scatter-drum and carries an operating knob 70 fastened to it against endwise movement by screws 71, which pass through the sleeve-portion 99 of the knob 70. The square portion of the shaft 69 engages a square hole in a bush 72 the outer surface of which is non-circular (see Figure 4) to engage a corresponding non-circular enlargement in the front end of the tubular shaft 50. The bush 72 may be secured to the shaft 50 by any suitable means, not shown in the drawings. The rear end of the square shaft 69 carries a screw 73 of which the head constitutes a flange-like abutment for a compression spring 74 between it and the rear face of the bushing 72; the shaft 69 is thus pressed in a rearward direction so that the teeth 67 on the locking-plate 66 mesh with the gears 65 on the pinion-shafts 55 and lock them against rotation. In this position the boss 68 abuts against the front edge of the bush 72.

At the rear end of the scatter-drum there is a disc 75 surrounded by a metal bushing 76 having a radially-projecting flange 77 which engages with a bearing support at the rear end of the machine. The parts of the scatter-drum are all held together by screws 78 in the rear ends of the pinion-shafts 55, the screws abutting against the disc 75.

Each of the discs 51, as shown in Figures 2, 3 and 5, supports a metal ring 79 having an integrally-formed radially-projecting flange 80 of which the rear face is planar and the front face is bevelled as shown in Figure 2. Each flange 80 (see Figures 3 and 5) is formed with a series of gaps or notches 81 distributed around it in an arbitrary and irregular fashion. The purpose of these gaps will be explained hereinafter. Attached to each flange 80 is a gear-and-cam ring 82. This ring comprises a mutilated external gear 83 and a series of profile cams 84. The gear-teeth 83 are distributed around the ring in an arbitrary and irregular fashion and the cam surfaces 84 are spaced and shaped in a manner interrelated with the grouping of the gear-teeth 83, for a purpose hereinafter explained. Each ring 79 is formed with a complete internal gear 85 which is adapted to mesh with a pinion lying in the same transverse plane and carried on any of the pinion-shafts 55.

The rings 79, each with its gapped flange 80, gear-teeth 83 and cams 84, are hereinafter referred to as the "scatter-gears".

In the present machine there may be twenty-five scatter-gears (only ten, however, are shown in Figure 2) each being rotatably mounted about one of the discs 51. By reason of the shape of the discs 51 it will be seen that it is possible for any one of the pinion shafts 55 to carry a pinion, two of which are shown at 87 and 88 so as to mesh with any one of the internal gears 85. In one convenient arrangement the pinion-shaft 55 shown in the top half of Figure 2 carries pinions which mesh with the first, sixth, eleventh and sixteenth gears 85. Another of the shafts 55 carries pinions which mesh with the second, seventh, twelfth and seventeenth. A third shaft 55 carries pinions which mesh with the third, eighth, thirteenth and eighteenth, and so on.

Each pinion-shaft 55 carries near its forward end a pinion 86 pinned to it and adapted to mesh with the internal teeth 64 on the inside of the setting-dials 63. Thus, the first setting-dial meshes with a pinion 86 on one of the pinion-shafts 55 (as shown in Figure 2), and each of the other dials 63 meshes with a pinion on one of the other shafts 55 so that rotation of each dial 63 rotates one of the shafts 55. Such rotation rotates all the pinions 87, 88, etc. on that shaft, in whatever longitudinal position they may have been assembled. If the pinions are arranged as above described, five of the scatter-gears spaced apart along the drum will be rotated by each pinion-shaft, but it must be understood that the pinions 87, 88 etc. may be arranged in any other arbitrary fashion. For example, one setting-dial 63 might be geared to fourteen of the scatter-gears, another might be connected to five, a third might be connected to three, a fourth to two and the fifth to only one. The pinions 87, 88, etc. are housed in the depressions 53 in the disc 51 and it is a matter of choice as to which of these depressions are occupied by pinions and which are left empty. It is therefore possible by a simple operation to re-design the scatter-drum throughout merely by rearranging the positions of the pinions. The pinions 87, 88, etc. are free against longitudinal movement on the pinion-shafts so that when the screws 78 are withdrawn the whole assembly may be unstacked and rearranged in any manner desired. It is not necessary, however, for the gears 65 and pinions 86 to be slidable longitudinally of the pinion-shafts, and these are therefore pinned on as above described.

An initial setting is applied to the scatter-wheels by withdrawing the knob 70 so that the locking-plate 66 comes out of mesh with the gears 65. The knob 70 and shaft 69 are held out in their withdrawn position by any desired means. For example, the front end of the shaft 69 may be circular (as shown in Figures 1 and 2) with the knob 70 rotatable on it. The sleeve-portion 99 of the knob may be non-circular so as to co-operate with an aperture of the same shape in a fixed frame-member 100 (Figure 1). The shaft 69 may be held in its disengaged position by first withdrawing the knob and then rotating it so that the non-circular portion is out of register with the aperture in the frame-member 100. The setting-dials 63 are then selectively rotated according to some code word or number. The dials may bear letters, numerals or other characters on their edges, and a fixed index or window (not shown) is provided against which the setting of the dials may be read off. When each pinion-shaft 55 has been rotated by the desired extent the locking-plate 66 is let into engagement with the gears 65 which are thus locked against further individual movement although, as will appear hereinafter, the scatter-drum is rotated solidly as a whole during the return movement of the movable carriage.

It will now be appreciated that the reason for making the shaft 69 and the bushing 72 non-circular is to prevent relative rotation between the locking-plate 66 and the gears 65.

The number of teeth on each gear 65, the number of internal teeth on the setting-dials 63, and the angular intervals between the radial axes upon which the pinion-shafts 55 lie, are so inter-related that the teeth 67 on the locking-plate 66 can always engage the gears 65 in accurate register. This is a matter of gear design and need not be discussed in detail here, but it will be apparent that the angular intervals between the pinion-shaft axes are not necessarily all equal to 72° although they are so illustrated.

In some circumstances it is desirable that the scatter-gears should be set in some pre-arranged manner which is not visible from inspection of the various positions of the setting dials 63. For this purpose the invention provides (see Figures 3 and 6) two radially-arranged metal plates 89 having knobs 90 and each engaging a pin 91 screwed into the front disc 49 by a radial slot. The radially outward movement of each plate is limited by a screw 93 also screwed into the front disc 49. As can be seen from Figure 6 the outward edge of each plate is undercut; each plate 89 masks the gear-teeth 64 on the front setting dial 63 when the plates are in their radially outermost position; but when the screws 93 are slackened and the plates 89 are pressed radially inwards, the front setting-dial 63 may be pulled forwards until it abuts against the ledge 94 of each plate. This forward movement is sufficient to disengage the internal teeth 64 from the teeth of the pinion 86. Similarly the second, third, fourth and fifth setting-dials 63 can then be moved forward and disengaged from their pinions. In this position the setting-dials may be rotated idly to zero or to any other desired position, and then moved rearwardly to re-engage with the pinions. The original setting of the various scatter-gears is in this manner deleted and no visible indication of it remains in the machine. It will be understood that when the setting-dials 63 have been moved rearwardly into re-engagement with the pinions 86, the plates 89 are pulled radially outwards by means of the knobs 90 and the screws 93 are tightened up so that the setting dials are again locked against longitudinal movement.

At the rear end of the scatter-drum a metal bush 95 (see also Figure 12) is let in to the shaft 50 and is formed with a square hole 96 for engagement by the spindle of a hand-crank (not shown) whereby the scatter-drum may be rotated in a convenient manner through any desired number of revolutions, for a purpose hereinafter explained.

The rear end of the scatter-drum is also formed with a radial key-way 97 running through the wall of the shaft 50, through the disc 75 and through the wall of the bush 76. This key-way co-operates with a setting-key 269 (Figure 12), carried by the frame of the machine, in a manner hereinafter described.

The metal parts of the scatter-drum assembly are preferably made of a light alloy such as a magnesium alloy. Other parts, such as the discs 51, 49, 59, 75 and the setting-dials 63 may be made of synthetic resin such as the material sold under the registered trade-mark "Bakelite"

*The cipher-wheel sub-frame and cipher-wheel detents*

The cipher-wheel sub-frame with its associated parts will be understood by reference to Figures 7a, 7b, 8, 11, 14, 15 and 19. The sub-frame comprises two end-plates 101, 102 interconnected by strengthening members 103, 104, running from front to back of the machine, and a main frame-bar 106 of rectangular cross-section.

The frame is pivoted about an axle 107 and carries on a shaft 108 a number of type-wheels 109 (herein termed the "cipher-wheels"). Each cipher-wheel comprises a disc of synthetic resin having the letters of the alphabet, numerals, or other characters molded in relief around its periphery as shown at the left-hand end of Figure 7a, and each cipher-wheel is rotatable upon the shaft 108 but is normally held against rotation by detents described below. In addition, each cipher-wheel carries a metal gear-wheel 110 non-rotatable with respect to it.

As has been explained in the opening paragraphs of this specification, the cipher-wheels are rocked so as to have their gears 110 engaged by the teeth 83 of the scatter-gears during the return movement of the carriage, and the object of the mechanism about to be described is to ensure:

(1) That the cipher-wheel frame is locked, during the return movement of the carriage, in a position in which the cipher-gears engage the scatter-gears;

(2) That the sub-frame is automatically released and returned to its position for typing, at the end of the return movement;

(3) That the cipher-wheels are prevented from rotating idly during the return movement, which rotation would otherwise be possible when the gear on a cipher-wheel lies adjacent to a part of the scatter-gear 83 on which there happen to be no teeth;

(4) To prevent the cipher-wheels from rotating idly during the typing operation.

Each end-plate 101, 102 carries a roller 118, 119 rotatable about substantially vertical axes and adapted to co-operate with inclined cam faces formed on a longitudinal cam-bar 120 which is suitably guided for longitudinal movement in the upright frame-members 47 and 48 of the machine. At its forward end the cam-bar 120 is pivoted to a clutch actuating lever 121, the function of which is to establish and disestablish a drive between a worm 122 and the scatter-drum gear 60, in a manner more fully described below. At the rear end of the machine the cam-bar 120 (see Figure 7b) is pivoted to a rocking lever 123 pivoted at 124 to the vertical frame member 48 and co-operating at its other end with the carriage return mechanism. The cam-bar 120 is formed with a notch 125 adapted to be engaged by a pawl 126 pivoted at 127 to the frame of the machine and having a toe 128 for engagement by a lateral enlargement 129 of a longitudinal rail 116 which is guided for endwise movement on a fixed longitudinal channel 276.

The complete operation of the machine is more fully described hereinafter, but it may here be explained that at the beginning of the return movement of the carriage the lever 123 is rocked so as to draw the cam-bar 120 rearwardly. The oblique portions on the cam-bar press the rollers 118, 119 laterally whereby the cipher-wheel sub-frame is rocked about the axle 107 so that the gears 110 on the cipher-wheels engage with the scatter-gears. Longitudinal movement of the cam-bar 120 brings the notch 125 opposite the pawl 126 which snaps into the notch under the action of a spring 131 and latches the cam-bar in its rearward position so that the cipher-wheel sub-frame is locked in the position in which the cipher-wheel gears engage the scatter-gears. A second notch 111 is provided in the cam-bar 120 for a purpose hereinafter explained.

When the cam-bar 120 is latched in its rearward position as above explained the toe 128 lies in the path of movement of the projection 129. At the end of the return movement of the carriage the rail 116 is moved forwardly by means hereinafter described, and such forward movement causes the projection 129 to rotate the pawl 126 so as to release it from the notch 125; the cam-bar 120 therefore returns to its forward position shown in Figures 7a and 7b under the action of a spring 132, so as to enable the cipher-wheel sub-frame to be rotated into its disengaged position under the action of springs 133 anchored to the frame of the machine.

Associated with each gear 110 is a floating lever 134 pivoted at 135 to a longer lever 136 which pivotally engages by trunnions 137 a longitudinal groove in the bar 106. The levers 136 are constrained at their upper ends in slots formed in the channel 276, which slots are closed by a bar 277 referred to below. The levers 136 are pressed towards the cipher-wheels and scatter-gears by springs 138 engaging their lower ends an anchored to the strengthening bar 104. Each of the floating levers 134 has a detent-tooth 139 adapted to engage the gear-teeth on the appropriate gear 110 and a tappet 140 which co-operates with the cams 84 of the scatter-drum.

Figure 8:
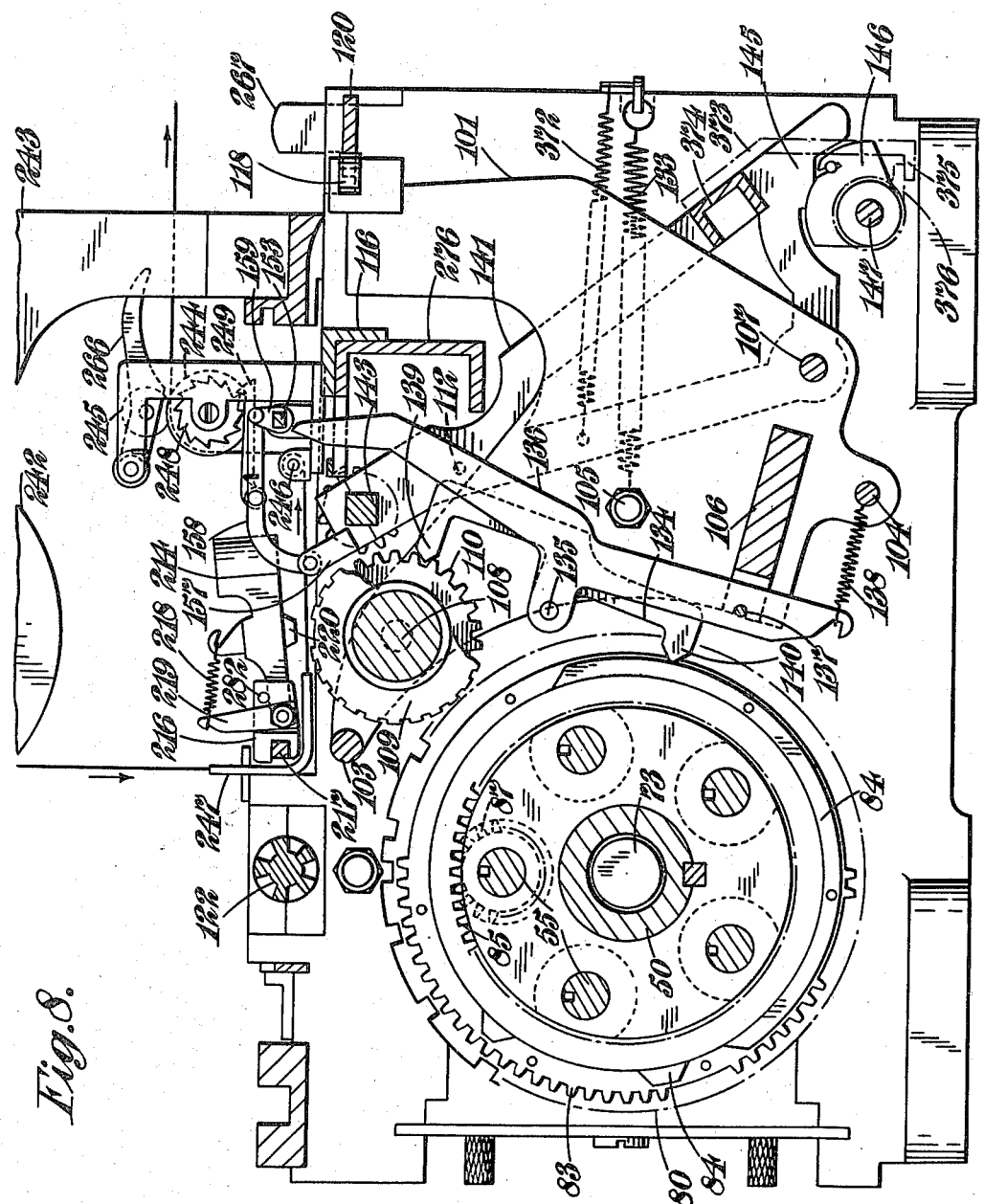

When the cipher-wheel sub-frame is in the position shown in Figure 8, which is the position it occupies during the typing run of the carriage, the tension in the springs 138 presses the tappets 140 on to their appropriate scatter-wheels. If a tappet 140 happens to be abutting against a cam 84, the cam keeps the detent 139 in engagement with the teeth 110; on the other hand when the tappet 140 reaches a valley between the cam surfaces the long lever 136 rocks slightly to the left (as seen in Figure 8) about the trunnions 137 and a pin 112 on the lever 136 engages the top end of the floating lever 134 and holds the detent 139 into engagement with the gear 110. The cipher-wheels are thus normally locked against rotation during the typing run. However, as explained below, each cipher-wheel is released when it is engaged by the selector wheel on the depression of a typing key.

During the return movement of the carriage the cipher wheel sub-frame is rocked, as above explained, about the axle 107, and the cipher-wheel gears 110 are brought into a position for engagement by the teeth of the scatter-gears 83. This position is shown in Figure 19. Considering one of the cipher-wheels in this position, it will be seen that the tappet 140 presses the detent 139 into the teeth 110 so as to lock the cipher-wheel except when there are teeth 83 in such position as to engage the cipher-wheel gear 110. During rotation of the scatter-drum, when a tooth 83 reaches the position for mesh with the teeth 110, the cam 84 falls away and allows the tappet 140 to move towards the axis of the scatter-drum. Further movement towards the scatter-drum by the long lever 136 is impossible since this is obstructed by the rail 277 at its top end, and the result is that the floating lever 134 is freed from constraint and, as its centre of gravity lies on the left-hand side of its pivot 135 (see Figure 19), it rocks by its own weight in such direction as to release the detent 139 from the cipher-wheel gear which is therefore free to turn by the inter-engagement with it of the scatter-gear 83.

*The selector-wheel sub-frame*

Figure 14:
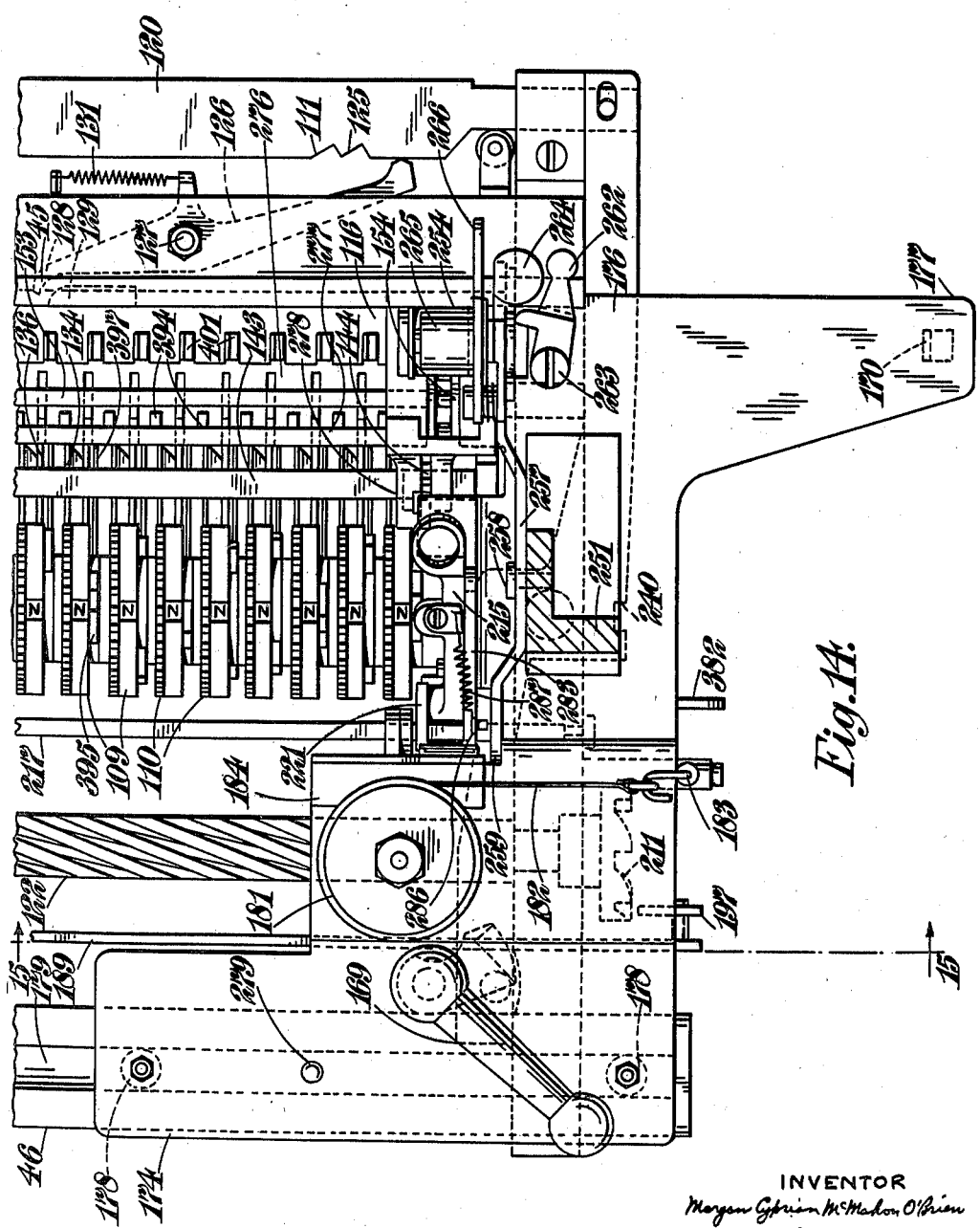
Figure 14 is a plan view of the rear end of the machine.

The selector-wheel sub-frame is illustrated in Figures 7a, 7b, 8, 9, 11, 14 and 20. It comprises a pair of end-plates 141 and 142 carrying near their upper end a shaft 143 which is circular where it engages the bearings in the end-plates, but of square section elsewhere. Slidable along the square portion of the shaft 143 is the selector-wheel 144 which is constrained to move along with the carriage in a manner hereinafter explained, by a fork 278 (see also Figure 1) projecting downwardly from the carriage as shown in Figures 11 and 14.

Like the cipher-wheel sub-frame the selector-wheel sub-frame is pivoted about the axle 107. At its lower and outer end 145 it is formed with a portion adapted to be engaged by cams 146 of which there may be two, one at each end of the machine. These cams are mounted on a longitudinal shaft 147 which, as explained hereinafter, is interlinked at its front end with the typing mechanism in such manner that it is rocked in the direction of the arrow in Figure 20 every time a key is depressed and returned when the key is released.

The selector-wheel shaft 143 also carries at the front end of the machine a fixed (i. e. non-slidable) pinion 148, which serves to transmit the drive from the keyboard mechanism to the selector-wheel 144 in a manner which will now be described.

The keyboard mechanism drives a bevel-gear 149 (Figure 7a) at the front of the machine which is mounted on the same shaft 150 as a typewheel 151 (herein termed the "plain-language" wheel) in which the letters or numerals are so arranged as to correspond with the characters on the typing keys so that when a key for a given letter is depressed, that letter is printed by the plain-language wheel. The plain-language wheel carries a gear 152 adapted to mesh with the pinion 148 when the selector-wheel frame is rocked towards the cipher-wheels. It will now be seen that when the selector-wheel frame is rocked as above described, the pinion 148 meshes with the gear 152 and the selector-wheel 144 meshes with one of the cipher-wheel gears 110 (as shown in Figure 20). The selector-wheel shaft thus acts as a lay-shaft to transmit the drive from the bevelled-gear 149 to the particular cipher-wheel with which the selector-wheel happens to be in mesh; and the cipher-wheel is therefore rotated through an angle corresponding to the key which is depressed.

It will be understood that it is necessary for each detent 139 to be removed from the cipher-wheel gear before the selector-wheel engages it and to be replaced when the selector-wheel disengages it. The detent-removing mechanism for effecting this operation will now be described.

On a square-sectioned shaft 153 mounted in suitable bearings and running from back to front of the machine is a triangular detent-removing member 154 adapted to engage by its downwardly-projecting corner 155 with the tips 156 of the upper ends of the long detent levers 136. The detent-removing member 154 is conveniently built up of two triangular plates separated by pins as shown in Figure 7b.

At the front end of the machine the end-plate 141 of the selector-wheel sub-frame carries an upward extension 157 pivoted to a curved link 158, the other end of which is pivoted to a short crank 159 non-rotatably mounted upon the square shaft 153. When the selector-wheel frame is rocked so as to engage the selector-wheel with one of the cipher-wheel gears, the link 158 rotates the crank 159 and therefore the shaft 153 (as shown by the arrow in Figure 20) so that the detent-removing member 154 presses the tips 156 of the detent levers to the right as seen in Figure 20, with the result that the floating lever 134 falls away by gravity (as hereinbefore explained) and releases the gear 110 of the particular cipher-wheel with which the carriage happens to lie in register. Similarly when the selector-wheel frame is rocked back to its original position, the shaft 153 is returned and the lever 136 re-inserts the detent 139 to lock the cipher-wheel against rotation.

The selector-wheel sub-frame is returned to its position in which it is disengaged from the cipher-wheels by a spring 372. However, it may be found desirable to provide means whereby the sub-frame is positively returned on the release of a typing key. Such means may comprise metal plates 373 interconnected by a channel member 374 and having downwardly-projecting lugs 375 for engagement by arms 376 fixed on the cam-shaft 147. When the shaft 147 rotates anti-clockwise (as seen in Figure 11) the arms 376 positively engage the lugs 375 whereby the selector-wheel sub-frame 141, 142 is forced back into its position of disengagement from the cipher-wheels so that the spring 372 is not relied on for this important operation.

The scatter-drum clutch

The scatter-drum clutch and associated parts are shown in Figures 7a, 7b, 8, 9 and 10. Mounted on a longitudinal stub-axle 160 at the front end of the machine (Figure 1) is a gear-wheel 161 which is slidable forwardly into engagement with the gear-wheel 60 of the scatter-drum and which meshes with a gear 162 carried on the front end of a helically-splined shaft 122 (herein termed the "worm"). The worm 122 is mounted in suitable bearings in the front and back upright frames 47 and 48.

The gear 161 is formed integrally with a flange 163 which is engaged by the forked end 164 of the front lever 121 which is pivoted to the frame of the machine at 165.

The rocking lever 123 at the back of the machine is formed at its right-hand end with an upstanding pin or roller 166 adapted to be engaged by a cam 167 (see also Figure 11) rotatable about a vertical axis and carried by a spindle 168 to which a handle 169 is attached. The handle is mounted upon the movable carriage in a manner described later, and is grasped by the operator at the beginning of the return movement and is rotated in the direction of the arrow shown in Figure 7b. Such rotation forces the cam 167 against the roller 166, so that the lever 123 is rotated clockwise about the pivot 124; consequently the cam-bar 120 is moved rearwardly as has already been described. Rearward movement of the cam-bar rocks the front lever 121 and moves the intermediate gear 161 into mesh with the scatter-drum gear 60. Up to this point no movement of the movable carriage has taken place. The movement of the handle 169 is arrested by a pin 279 (see Figure 14 and Figure 1). Continued force on the handle 169 moves the movable carriage from the rear to the front of the machine and a nut-member (described later) on the carriage engaging with the worm 122 rotates the worm and drives the scatter-drum through the train of gears 162, 161 and 60. Rearward movement of the cam-bar 120 has rocked the cipher-wheel sub-frame into engagement with the scatter-drum (as above described) so that the scatter-wheels rotate the cipher-wheels during the return movement according to the distribution of the teeth 83 on the scatter-wheels. It will be understood that this action is a fundamental component of the subtlety of the cipher which the machine produces, since each cipher-wheel is thus rotated in a different and arbitrary manner.

At the end of the return movement of the carriage a downwardly-projecting abutment 170 (see Figures 12 and 14) carried on the left-hand side of the movable carriage strikes a metal plate 171 (Figure 7b) attached to the longitudinal rail 116. The rail 116 is thus shifted forwardly, the pawl 126 releases the cam-bar 120 and the front lever 121 is rocked to return the gear 161 to its position out of mesh with the scatter-drum gear 60. The rail 116 is spring-pressed towards the rear of the machine by a spring 172 engaging a rod 173 screw-threaded into the rail. Other operations, such as the release of the cipher-wheel sub-frame, occur at the end of the returning movement of the carriage but they are described elsewhere in this specification.

Zeroizing

A third position of the intermediate gear 161 is provided for the purpose of zeroizing the scatter-drum. "Zeroizing" is the operation of returning the scatter-drum and all the cipher-wheels to their original position, after a message has been sent and it is performed by engaging the cipher-wheels with the scatter-gears, without engaging the scatter-drum with the worm 122.

To zeroize, the operator presses the thumb-plate 267 at the front end of the cam-bar 120 so that the second slot 111 is engaged by the pawl 126. The cipher-wheel frame is retained in its position of engagement with the scatter-drum by the engagement of the unnotched portions of the bar 120 with the rollers 118, 119. Movement of the bar 120 into this position rocks the front lever 121 so as to move the intermediate gear 161 out of mesh with the scatter-drum gear 60 and out of mesh with the gear 162 on the front end of the worm 122. The gear 60 remains in mesh, however, with a counter-driving gear 268 (see Figure 9) which drives counting mechanism of any known kind, indicated by the numeral 280 in Figure 1. The counting mechanism indicates the number of gear-teeth through which the scatter-drum has rotated during the sending of a message. The operator now inserts the hand-crank into the square-holed bush 95 (Figure 2) and rotates the scatter-drum until the counter indicates zero.

It is essential that the scatter-drum should be inserted or removed from the machine only when it is in its zero position, and for this purpose the key-way 97 described with reference to Figure 2 is provided. This key-way co-operates with a key 269 (see Figure 12) which has an inwardly-projecting tip 270 to enter the tubular shaft 50.

The scatter-drum is held in position in the machine by bearing plates 271 and 272 which are formed with curved recessed surfaces to engage the metal bushes 57 and 76 respectively, the bushes constituting the bearings for the drum. Each bearing plate 271, 272 may be locked in position by a plate 273 rotatable on a screw 274 and engaging recesses at 275 in the frames 47, 48.

The key 269 constitutes a mounting for the ribbon spool detent 236 hereinafter described and has a rearwardly-extending lug 276a which forms the bearing for a key-lock lever hereinafter described.

Scatter-drum lock

It is necessary that the scatter-drum should be prevented from rotating except when it is in gear with the worm 122, and for this purpose the invention provides (see Figures 9 and 21) a lever 377 pivoted at 378 to a bracket 379 carried on the front frame-member 47 of the machine. The lever has a downwardly-projecting tail 380 which is adapted to make locking engagement with the teeth of the counter-driving gear 268. The lever is pressed towards its disengaged position by a spring 381, but, when the lever system 121, 120, 123 is in the position it occupies during the typing run of the carriage, the lever 121 at the front end of the machine abuts against the top end of the lever 377 so that the tail 380 is pressed into engagement with the teeth of the gear 268 whereby the scatter-drum is locked against rotation during the typing run. However, at the beginning of the return movement of the carriage the cam-bar 120 is shifted rearwardly as above explained so that the front lever 121 is rotated about its pivot 165 and the cipher-wheel sub-frame is rocked into engagement with the scatter-wheels. The movement which occurs in the lever 121 causes it to free the lever 377 from its locking position from which it is retracted by the spring 381 until the return movement of the carriage has been completed. Thereupon the cam-bar 120 and therefore the front lever 121 return to their original position and the gear 268 and consequently the scatter-drum are again locked against movement during the typing run which ensues.

It will be understood that when the thumb-plate 267 is pressed to move the cam-bar 120 into its zeroizing position the front lever 121 moves further away from the top limb of the lever 377 so that the gear 268 and scatter-drum remain free to rotate.

The movable carriage

The movable carriage will be described with reference to Figures 8, 11, 12, 14 and 15. It comprises a main guiding-member 174 (see Figure 14), a nut-housing 184 to co-operate with the worm 122, and an auxiliary guide 176 having a tail-portion 177. The main guide 174 carries two downwardly-projecting rollers 178 which engage a groove 179 in a longitudinal frame-member 46. The guide 176 slides in a groove 180 in an angle member 45 running from front to back of the machine (see Figure 12). The carriage is impelled towards the rear of the machine by means of a spring drum 181 mounted on it and having a steel tape 182 connected to its spring and anchored at the rear end of the machine to an upstanding hook 183. In an alternative arrangement (not shown in the drawings) the spring drum may be carried at the rear end of the machine and the tape 182 anchored to the carriage.

The spring drum is mounted on a raised portion 184 of the carriage beneath which there is mounted a nut-member 185 which engages the worm 122 in the manner of a gear (Figures 11 and 15).

Trigger mechanism

The carriage also carries trigger mechanism which co-operates with the gapped flanges 80 of the scatter-drum. The trigger mechanism (Figure 15) comprises a link 186 pivoted at 187 and carrying a pin 188 projecting sideways from it and adapted to be operated by a trigger-releasing rail 189 more fully described below. The trigger itself comprises a pawl 190 mounted on a rocking shaft 191 having a radially-projecting lever 192 formed with a pin 193 which engages a slot 194 in the lower end of the link 186. During the typing movement the pawl 190 collides with the flanges 80 and thereby arrests the rearward movement of the carriage until it is released by mechanism now to be described.

Trigger-releasing mechanism

The rail 189 runs from the back to the front of the machine in guides in the machine frame and is formed with two slots 195, one at the back and one at the front, each engaged by a pin 196. By reason of the inclination of the slots 195 to the vertical, forward longitudinal movement of the rail causes it to move upwardly, engaging and lifting the pin 188 and the link 186 as it does so. When the link rises it lifts the pin 193, rotates the shaft 191 whereby the pawl 190 is lifted clear of the scatter-drum flanges 80.

The necessary longitudinal movement of the rail 189 is imparted to it by a transverse shaft 396 at the back of the machine which carries a lever 197 to which the rear end of the rail 189 is pivoted (see also Figures 12 and 13). A coiled spring 198 presses the lever 197 forwardly but rotation of the shaft 396 in this direction is normally prevented by latch mechanism comprising an arm 199 mounted at the other end of the shaft 396 and carrying a pin 200 adapted to be latched under the latch-shaped end 201 of a lever 202 pivoted to the frame of the machine at 203 and spring-pressed towards its latched position by a spring 204 (Figure 13).

The lever 202 has pivoted to it, at a point 206 near the bottom, a weighted pawl 205 which normally rests in the position shown in Figure 13. The front face of the pawl is formed with a tooth 207 which is engaged by an arm 208 carried on a rearward extension of the cam-shaft 147 and impelled upwardly by a tension spring 281. The shaft 147 is rotated so as to move the arm 208 downwardly when a typing key is depressed and to move it upwardly when the typing key is released. When the arm 208 moves downwardly (see Figures 12 and 13) its end 209 strikes against the butt face of the tooth 207 and rotates the pawl 205 about its pivot 206. The arm continues downwardly until it has passed the tooth whereupon the pawl drops back to its original position resting upon a pin 210 at the foot of the lever 202. When the arm 208 moves upwardly, the pawl 205 being non-rotatable because of its abutment against the pin 210 is wedged out rearwardly so that the lever 202 is rocked about its pivot 203. The top end 201 of the lever therefore moves forwardly and releases the pin 200 so that the shaft 396 is rotated by the spring 198 in such direction as to push and lift the rail 189. The pawl 190 depending from the movable carriage is thus released as has already been described, so that the carriage is free to move on to the next scatter-wheel flange 80.

However, immediately the carriage moves, the nut-member 185 rotates the worm 122. Carried at the rear end of the worm is a face cam 211 which, when rotated in an anti-clockwise direction (as viewed from the front of the machine) engages a forward projection 212 on the lever 197 (Figure 13) so as to rock the shaft 396 back into its original position in which it is held by the lever 202 which springs into its latching position to secure the pin 200. The rearward and downward movement of the rail 189 lowers the pawl 190 into the path of the next scatter-drum flange 80 so that the rearward movement of the carriage continues only until the pawl 190 finds a portion of a flange 80 in its path.

The design of the flanges 80 gives rise to an erratic rearward movement of the carriage which may move through a distance of one flange or more according to the arrangement of gaps 81, and it will readily be appreciated that this gives rise to an important added degree of subtlety in the cipher produced by the machine.

During the return movement of the carriage the pin 200 is latched down by the lever 202 so that the projection 212 on the lever 197 lies out of the path of the teeth on the face cam 211 so as to allow the worm 122 to rotate.

As shown in Figure 11, the rocking shaft 191 of the pawl 190 carries a lateral projection 175 which is offset towards the front of the machine. When the cipher-wheel sub-frame is rocked into engagement with the scatter-drum, the strengthening bar 103 depresses the projection 175 so that the pawl 190 is lifted out of the way of the flanges 80. During the return movement of the carriage the pawl therefore clears the scatter-drum flanges. However, such an arrangement is not essential because the pawl would be automatically lifted by its contact with the flanges during the return movement of the carriage.

*Typewriter ribbon feed*

The typewriter ribbon is mounted on a spool 231 (see Figure 16) on the front end of the machine from which it passes over a guide pulley 232 horizontally over the topmost portions of the plain-language wheel 151 and of all the cipher-wheels 109. At the back of the machine (see Figure 12) the ribbon is guided over a pulley 233 down to a take-up spool 234. The spool 234 is formed with a set of ratchet teeth 235 engaged by a gravity pawl 236 which prevents it from rotating in a right-handed direction. A driving pawl 237 is pivoted to the lower end of a lever 238 and is pressed into engagement with the teeth of the ratchet by a spring 239. The upper end of the lever 238 engages a notch 240 in the rear edge of the rocking lever 123 at the back of the machine (see Figure 7b). Every time the movable carriage completes a typing run the lever 123 is rocked so that the notch 240 describes a sideways movement; such movement rocks the lever 238 about a pivot 241 so that the spool 234 is gradually fed round in such a direction as to draw the typewriter ribbon along the machine from the front spool 231.

*Paper feed*

At the front end of the machine there is a fixed cylindrical container 242 which houses a roll of paper strip and is mounted on a supporting bracket 243 (see Figure 8).

The paper is fed through a guide 247, (see Figure 9), over the plain-language wheel 151, under a guide-roll 246, over a roll 244 which has a cooperating roll 245 spring-pressed towards it. The roll 244 carries a ratchet-wheel 248 which is engaged by a driving pawl 249 pivoted to the curved link 158 which actuates the detent-removing device. The pawl 249 is spring-pressed upwardly and is moved so as to rotate the ratchet-wheel 248 every time the selector-wheel sub-frame is rocked so that the paper is fed past the printing position step by step.

The paper feed for the movable carriage is somewhat different and is shown in Figures 11 and 12. A roll container 250 is mounted on a bracket 251 supported on the movable carriage. The paper passes from the container through a guide 252, over the cipher-wheel 109, under a pulley 253, and thence over a pulley 254 which carries ratchet-wheels engaged by two spring-pressed pawls 255 and 256 mounted on a lever 257 which is pivoted to the frame member 251 at 258 and has a tail 259 formed with a rectangular notch to engage the hammer shaft 217. The lever 257 is held in the position shown by a tension spring 290.

The pawl 255 engages a ratchet-wheel 261 having only two teeth. The pawl 256 engages another wheel 260 mounted alongside the ratchet-wheel 261 and having ten teeth. During typing, the hammer shaft 217 in its rotation tilts the lever 257 every time a typing key is struck. The result of the tilting movement is that the pawl 256 feeds the take-up roll through the distance of one tooth on the wheel 260 every time a key is struck. However, at every fifth movement by the pawl 256 the upward movement of the lever 257 causes the pawl 256 to engage one of the teeth on the wheel 260 so that for every fifth letter typed the paper receives a double endwise movement. Thus the letters are spaced into groups of five.

A short lever 262 (see also Figure 14) is pivoted at 263 and may be swung into the path of the pawl 256 so as to render it inoperative. With the parts in this position the paper is fed without any gaps between the groups of letters.

The lever 257 is extended upwardly to form a knob 264 by which the feeding mechanism may be operated manually when the paper is being threaded through. A roll 265 is spring-pressed downwardly on to the roll 254 so as to grip the paper strip between them, and a finger lever 266 may be provided whereby the roller 265 may be lifted during the operation of threading the paper into position.

As shown in Figure 8 the paper feed mechanism for the plain-language wheel may similarly be provided with a finger lever 266.

The typing hammers

The hammers are described with reference to Figures 8, 9, 10, 11, 14 and 16. There are two hammers, one 214 for the plain-language wheel 151 and another 215 which travels with the movable carriage and prints from the cipher-wheels 109 in succession.

The hammer 214 for the plain-language wheel is pivoted to a bracket 216 (see Figures 8, 9 and 10) carried on a square shaft 217 running from the front to the back of the machine. A spring 218 between a hook on the hammer and an arm 219 carried on the bracket 216 normally holds the hammer in a position in which its striking face 220 is just above the type-wheel 151 so that when the hammer is lifted and released, as described later, it falls by its own weight so as to strike the type-wheel and then returns by the action of the spring 218 so as to allow the paper to move with respect to the carriage and the carriage to move with respect to the ribbon.

The shaft 217 is rotated to load the hammer and is then released (as described later) so as to cause the hammer to strike. During the striking movement, a pin 282 on the bracket 216 positively engages the hammer until it reaches the position shown in Figure 9.

The other hammer 215 (Figures 11 and 14) for the cipher-wheels is pivoted to brackets 221, 283 which are constrained to move longitudinally with the movable carriage. This hammer is operated by a lever 283 slidably but non-rotatably mounted on the square shaft 217. The lever is slotted at 284 to engage a pin 285 on the hammer and an arm 286 on the lever 283 is connected to the hammer by a spring 287 so that the hammer returns to the position shown in Figure 11 after striking.

Figure 10:
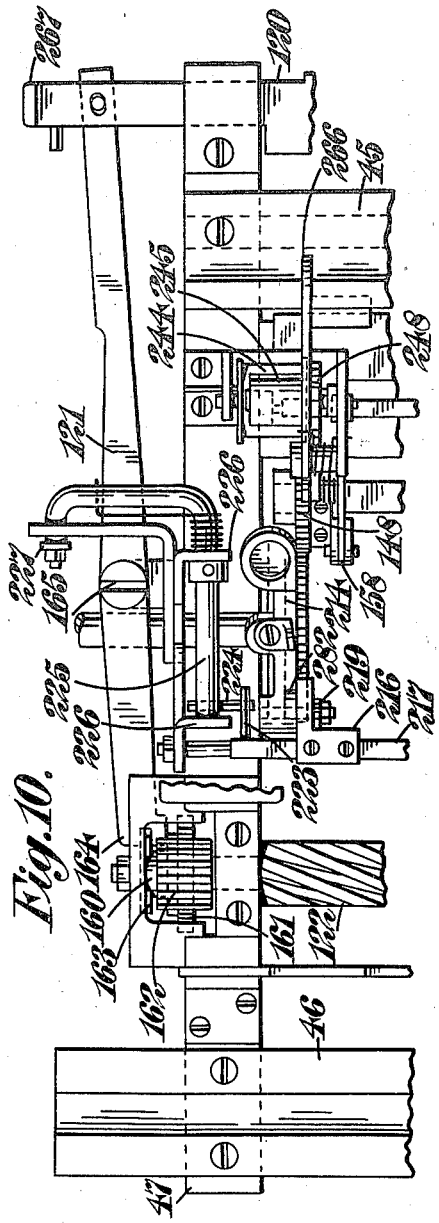
Figure 10 is a plan view of certain details at the front end of the machine.

The hammer loading and releasing mechanism will be understood from Figures 9, 10 and 16. At the front of the machine the square shaft 217 has a laterally-projecting pin 223 the underside of which is engaged by a pin 224 mounted on a transverse shaft 225 carried in brackets 226. The shaft 225 is curved round through two right-angles to receive at its front end a substantially vertical link 227 (Figure 16) the lower end of which is pivoted to an inclined link 228 the rear end of which is pivoted at 229 to a part of the keyboard assembly.

A spring 230 is provided to press the front end of the shaft 225 upwardly and therefore the pin 224 downwardly, but during the typing operation, as will be described later, the link 227 is drawn downwardly so that the pin 224 lifts the pin 223 and therefore rotates the hammer shaft 217 so as to lift both of the hammers, and then is suddenly released so that the hammers fall and printing is effected.

The keyboard mechanism

The keyboard mechanism is described with reference to Figures 16, 17 and 18. The keys 300 are pivoted on an upstanding edge 301 cast integrally with a base plate 302 and all the keys pass rearwardly underneath pivoted levers 303 the action of which need not be described in detail since they form part of the well-known Hammond typewriter, many other parts of which, as will appear below, are also incorporated in the present machine. The levers 303 engage a flange 304 mounted on a central spindle 305 slidable vertically in a guide 306 (see also Figure 1). The spindle 305 is spring-pressed downwardly by a compression spring 307.

Each key 300 is spring-pressed upwardly by a tension spring 308 engaging it in rear of the fulcrum 301, but its upward movement is limited by a cross-bar 309.

Each of the levers 303 is attached to an arm 312 each carried on an axle 313 from which driving levers 314 extend upwardly having pins 315 to engage slots 316 in the Hammond quadrant 317 which as shown in Figure 17 is formed with a bevelled gear to engage the gear 149 on the front end of the shaft 150.

Mounted in curved frame-members 318 and 319 is a series of vertical pins 320 each of which is spring-pressed downwardly and rests on one of the key bars 300 so as to be lifted when that key is depressed. Depression of a key lifts one of the pivoted levers 303 whereby the appropriate driving lever 314 is pushed forwardly so that its pin 315 drives the quadrant round in one direction or the other. The rotational movement of the quadrant is arrested by the pin 320 associated with that key, which pin projects from above the plate 319 into the path of a tail-portion 321 carried at the rear of the quadrant 317.

The quadrant 317 carries a T-shaped member 322 mounted on the same axis 323 as the quadrant. The arms of the T-shaped member extend into the slots 316 so as to be engaged by the pins 315. The tail-portion of the T-shaped member is constrained against movement with respect to the quadrant by springs 324, and these springs permit a small resilient lost motion between the pin and the quadrant at the end of the quadrant-movement, for a purpose explained below.

In the present machine it is essential that the tail 321 of the Hammond quadrant should return to the central position shown in Figure 17 at the end of each typing operation to ensure the selector-wheel 144 and the pinion 148 should engage their respective gears accurately at the next typing operation. For this purpose the mechanism comprises U-shaped levers 325 the upper ends 326 of which constitute dogs to engage with a downwardly and laterally projecting portion 327 on the tail 321 of the quadrant. Each lever 325 is pivoted as shown at 328 (Figure 16). In addition, each lever 325 carries projections 329 for engagement by the driving lever 314 on that side of the machine. Consider the key "P" on the right-hand side of the machine (see Figure 17) to have been depressed. The right-hand driving lever 314 moves forwards and rotates the lever 325 downwardly so as to move the dog 326 out of the path of the projections 327 so that the tail 306 of the quadrant is free to travel to the right. The left-hand dog 326, however, is undisturbed and remains in its projecting position so that as the quadrant returns to its central position when the key "P" is released the tail is arrested by the left-hand dog and tends to rebound from it. However, rebound is prevented by the right-hand dog 326 which has now been returned to its projecting position by the rearward movement of the right-hand driving lever 314.

The hammer loading and releasing gear

The rear ends 310 of all the keys 300 lie under a curved rail 311 which is attached by arms 330 to rearwardly-projecting arms 331 connected together by a shaft 332 which constitutes the axle about which the assembly rotates and by a shaft 333 at the rear which constitutes a pivot for an upwardly-extending lever 334. The pivot-shaft 333 is held up by a tension spring 291.

The lever 334 is formed with a ledge at its upper end to engage a tooth 335 on the link 228 so that as a key is depressed the bridge 311 is lifted, the pivot 333 moves downwardly drawing the lever 334 with it. The tooth 335 is thus pulled downwardly so that the hammers are lifted and loaded ready for striking as has already been described.

Right at the end of the downward movement of the lever 334 a forwardly-projecting toe 336 strikes against a screw 337 so as to be rotated in such direction as to release the tooth 335. The spring 230 of the hammer mechanism and the weight of the hammers themselves cause them to fall and effect the printing operation.

Mounted on the same pivot 333 is a shorter lever 338 having a forwardly-projecting tooth 339 at its upper end to engage with downwardly-inclined teeth 340 on a fixed rack 341 shown in Figure 16. A spring 342 normally holds the tooth 339 into engagement with the rack teeth 340 but when the pivot 333 reaches the bottom of its travel as above described and the toe 336 strikes against the screw 337 the lever 334 in being rotated rearwardly strikes against a pin 343 on the lever 338 so as to disengage the tooth 339 from the ratchet teeth 340. The tooth 339 is prevented from re-engaging itself with the rack until the completion of the upward movement of the typing key 300, because of the engagement of the front inclined face 344 of the lever 334 with the tooth 335 on the link 228. The purpose of the rack 341 will be explained below.

Automatic lock for typing keys

It is essential that the typing keys should be locked against movement when the movable carriage has completed its typing run until the carriage has been returned to the front of the machine in readiness for the next typing run, otherwise it would be possible for the typist inadvertently to type two consecutive letters from the rearmost cipher-wheel.

The mechanism for this purpose is described with reference to Figures 14, 15, 16 and 22. At the rear end of the machine and pivoted to the lug 276a of the scatter-drum key 269 (Figure 12) is a vertical lever 382 adapted to co-operate at the top with the rear edge of the portion 176 of the movable carriage and at the bottom with a collar 383 carried on a shaft 384 slidable longitudinally of the machine and guided in lugs 385, 386 and a front bracket 387. The shaft is spring-pressed rearwardly by a spring 388 between the bracket 387 and a collar 389 pinned on the shaft.

The shaft 384 also carries a boss 390 having a laterally-projecting plate-portion 391 which is slidable in a slot formed in a metal block 392 attached to the underside of the base plate 302 of the keyboard mechanism. It will be seen that when the movable carriage reaches the extreme rear end of the machine the lever 382 is rocked into the position shown in Figure 15 so that the shaft 384 is pushed forwardly, whereby the plate-portion 391 of the boss 390 moves into a position at which it overlaps a disc-shaped collar 393 carried on the lower end of the vertical spindle 305. It is therefore impossible for a key 300 to be depressed because the collar 393 holds down the spindle 305 and therefore the disc 304 which holds down the levers 303, against the underside of which the rear ends of the key-bars abut. However, when the carriage is at any other position, the spring 388 moves the shaft rearwardly so that the plate-portion 391 lies out of register with the disc 393 which is thus free to rise when a key is depressed.

It is also desirable that the keys should be locked against being depressed when the movable carriage is at a position between its positions of register with one cipher-wheel and the next cipher-wheel from which a letter is to be printed; otherwise, with very rapid typing it might be possible for the typist to cause the selector-wheel frame to be rocked into engagement with the cipher-wheels before the movable carriage has moved sufficiently for the selector-wheel 144 to lie in register with one of the cipher-wheel gears 110. If this should occur the selector-wheel would engage some other part such as the face of a cipher-wheel, and the machine would be damaged.

For this purpose the bar 277 mounted on the top surface of the channel 276 is formed with a plurality of upstanding dogs 394 (Figures 7a, 7b, 11, 14, 19 and 20) which, as shown in Figure 11 are just cleared by the detent-removing member 154 during the longitudinal movement of the movable carriage, provided the detent-removing member is in its unrocked position. The detent-removing member is of such width, (from front to back of the machine) that it can just pass between two adjacent dogs 394 when the selector-wheel 144 is in correct register with one of the cipher-wheel gears 110. However, if the parts are not in correct register and a key is depressed, the bottom corner 155 of the detent-removing member collides with one of the dogs 394 so that the angular movement of the square shaft 153 is arrested and the typing key is locked against further downward movement and rocking movement of the selector-wheel is arrested. The operator releases the key and the carriage then moves on in the ordinary way to its position of register, and typing can proceed.

Timing gear

The timing gear, which is of fundamental importance in a machine according to the present invention, involves parts which run through the whole of the machine from the typing keys, through the mechanism for rocking the selector-wheel sub-frame, to the carriage-releasing trigger, and the object of the timing gear is to ensure that the numerous operations which take place during the time between the beginning of the downward movement of a typing key and ending at the end of its upward movement shall occur in the proper order.

As has been already explained, the selector-wheel sub-frame 141, 142 is rocked into engagement with the cipher-wheels by cams 146 mounted on a shaft running from the back to the front of the machine. The actuation of this shaft by the keyboard mechanism will now be described with reference to Figure 18. The front end of the shaft 147 is mounted in a bearing 345 and carries a crank 346 pivoted to a laterally-extending rod 347 the other end of which is pivoted to a lateral extension 348 from an upright lever 349 oscillatable about a pivot 350 at its upper end. The lower end of the lever 349 is formed with an oblique notch-face 351 adapted to be engaged by a roller 352 carried on the forward end of a lever 353 which is attached to one of the levers 331 carried on the transverse shaft 332.

The vertical spindle 305 (see also Figure 16) is slotted to engage the forward end of a horizontal pivoted lever 354 the rear end of which has a laterally-extending pin 355 to engage with a slot 356 in a vertical link 357. The lower end of the link is pivoted to a catch 358 which is pivoted at 359 to a fixed part.

When the key 300 is depressed so that the bridge 311 is raised, the roller 352 moves downwardly and by engagement with the oblique edge 351 presses the lever 349 to one side. Such sideways movement of the lever 349 rotates the crank 346 through the connecting link 347 which rotates the shaft 147 so that the cams 146 rock the selector-wheel sub-frame into its position of engagement with the cipher-wheels as hereinbefore described.

Downward movement of the key also raises the spindle 305 so that the pin 355 moves down in the slot 356. This movement permits the link 357 to drop until the hook 360 of the catch 358 rests on the top of a vertical bar 361 carried at the bottom of the pivoted lever 349. When now the lever 349 moves sideways, under the action of the roller 352, the hook 360 of the catch drops over the top of the bar 361 and thus locks the bar 349 against returning. In this way the selector-wheel sub-frame is locked, for the time being, against withdrawal from its position in which the selector-wheel is in engagement with one of the cipher-wheels.

It will be understood that it is essential that the selector-wheel should move into engagement with the cipher-wheel before any rotation is imparted to the shaft 150, i. e. to the selector-wheel. This timing is achieved by an effective lost motion between the pins 315 and the co-operating arms of the T-shaped member 322 (see Figure 17). The roller 352 is in engagement with the oblique edge 351 from the very start of movement of the key, whereas the pins 315 cannot engage the arms of the T-shaped member 322 until a substantial movement of rotation of the appropriate axle 313 has taken place. Such an arrangement ensures that the selector-wheel is engaged with its cipher-wheel before the shaft is rotated.

It is also essential that the hammers should not print until the rotation of the selector-wheel, and consequently of the cipher-wheel and plain-language wheel, has been completed. This is ensured by arranging the lever 334 and its associated parts so that the toe 336 does not strike the screw 337 until the extreme end of the downward movement of the axle 333. By this time the operation of rotating the cipher-wheel will necessarily have been fully completed.

The purpose of the springs 324 will now become clear; the first part of the downward movement of the typing key effects the necessary rotation of the quadrant 317 the movement of which is arrested by one of the pins 320. Further downward movement of the key, which is necessary to engage the toe 336 of the lever 334 with the screw 337, causes the T-shaped member 322 to rotate idly, the quadrant being immovable. Such idle movement is accommodated by the springs 324.

It is essential that the selector-wheel should not be disengaged from its cipher-wheel until the printing operation has been completed. This is ensured by the arrangement of the lever 354 and the slotted link 357 as shown in Figure 18. At the extreme end of the upward movement of the key 300 the pin 355 engages the top of the slot 356 and lifts the catch 358 with the result that the lever 349 is free to move to its original position and the selector-wheel frame is disengaged from the cipher-wheels by the springs 372.

It may sometimes happen in the course of rapid typing that a key 300 is depressed and released without having been depressed to the full extent necessary to actuate the hammer release mechanism. Should this occur, the tooth 339 (Figure 16) remains in engagement with the rack 341 and prevents the lever 334 from returning to its original position. The lever 334 holds down the axle 333 which holds down the roller 352. This keeps the lever 349 pressed to one side so that the selector-wheel remains in engagement with its cipher-wheel and the carriage trigger release fails to operate. The typist immediately becomes aware of the failure of the carriage to move and rectifies the failure by fully depressing the key which was last struck.

The final operation, as far as the keyboard end of the machine is concerned, is the lifting of the catch 358 which allows the selector-wheel frame to be rocked out of engagement from the cipher-wheels, but it still remains to release the carriage so that it will travel rearwardly through another step before the next typing key is depressed. This release is effected automatically by the parts already described with reference to Figures 12 and 13. The return movement of the shaft 147 lifts the arm 208 and rocks the lever 202 out of engagement with the pin 200. The rail 189 lifts the pin 188 so that the pawl 190 is lifted out of engagement with the gapped flange 80 at which it had stopped. The carriage is therefore moved rearwardly by another step by means of the steel tape and spring 182, 181; the consequent rotation of the worm 122 re-sets the lever 202 and pin 200 by rotating the shaft 396 through the cam 211; the machine is then in readiness for the next letter to be typed.

It will be seen that the trigger mechanism on the carriage cannot be released until the selector-wheel has been disengaged from the cipher-wheel; that the selector-wheel cannot be disengaged from the cipher-wheel until the hammers have been operated; that the hammers cannot operate until the selector-wheel and the cipher-wheel with which it is in engagement have been rotated the required extent; and that the selector-wheel cannot be rotated until it has been enmeshed with the cipher-wheel. Moreover, the typing keys are locked against being depressed (1) while the carriage is in course of moving from its position of register with one cipher-wheel to its position of register with the next, and (2) when the carriage has reached the end of its typing run and has not been returned.

In order that the timing arrangements may be fully understood, there follows a description of the complete cycle of operations which occur during the downward and succeeding upward movement of one of the type-keys. It will be assumed that the key "P" on the right-hand side of the machine is depressed and released.

Stage 1

The key 300 begins its downward movement. As it does so eight operations take place, as follows:—

(a) The selector-wheel-frame is rocked by the roller 352 engaging the notch 351 so that the selector-wheel 144 engages a cipher-wheel-gear 110 and the pinion 148 engages the plain-language-gear 152.

(b) The arm 208 at the rear of the machine (see Figure 12) moves up, rocking the pawl 205 which falls back into the position shown in Figure 13.

(c) The right-hand dog 326 moves down out of the path of the projection 327 on the tail 321 of the quadrant 317.

(d) The appropriate pin 320 moves up into the path of the tail of the quadrant.

(e) The pin 355 moves downwardly, allowing the catch 360 to latch the selector-wheel subframe in its rocked position (Figure 18).

(f) The rocking of the selector-wheel-frame removes the detent 139 from the cipher-wheel.

(g) The pin 315 of the right-hand driving lever 314 (Figure 17) moves idly towards the right-hand arm of the T-shaped member 322.

(h) The lever 334 begins to descend and load the hammers.

Stage 2

Upon further downward movement of the key, the lost motion between the pin 315 and the arm of the member 322 having been taken up, the quadrant 317 is rotated to the left with the result that the plain-language wheel is rotated until the tail of the quadrant is arrested by the appropriate pin 320.

Hammer loading continues and the pin 355 continues its downward movement idly in the slot 356 of the lever 357.

Stage 3

Near the end of the downward movement of the type-key, the movement of the quadrant having been arrested by the appropriate pin 320, the pin 315 now rotates the T-shaped member 322 with respect to the quadrant, this lost motion being resisted by the springs 324. The toe 336 of the lever 334 now strikes against the screw 337 so that the lever 228 is released and the hammers strike; an impression is therefore taken from the cipher-wheel and from the plain-language wheel. During this stage the pin 355 continues to move down idly in the slot 356 and the selector-wheel-frame is still latched in its rocked position.

Stage 4

The key 300 now begins to move upwardly with the result that the lost motion of the T-shaped member 322 with respect to the quadrant is regained. Simultaneously the pin 355 begins its upward movement in the slot 356 and the hammer lever 334 begins its upward movement, the tooth 339 of the lever 338 being prevented from re-engaging with the teeth 340 by the engagement of the inclined face 344 of the lever 334 with the tooth 335.

Stage 5

Upon further upward movement of the key 300 the quadrant is returned to its central position at which the tail 321 is arrested by the abutment of the projection 327 against the left-hand dog 326. As the tail reaches the central position the right-hand dog is moved upwardly to prevent rebound of the quadrant. The pin 320 which was moved up now moves down, its task having been performed. During this stage the pin 355 continues to move up in the slot 356 and the hammer lever 334 continues its upward movement.

Stage 6

Towards the extreme end of the upward travel of the key 300 the pin 355 engages the top of the slot 356 and lifts the link 357. The link 357 lifts the catch 358 so that the selector-wheel subframe is rocked back into its disengaged position and the cipher-wheel-detent 139 re-engages the cipher-wheel-gear 110. During this operation the ledge at the top of the lever 334 re-engages the tooth 335 on the link 228 and the tooth 339 on the lever 338 re-engages the rack teeth 340.

Stage 7

The key has now reached the top of its travel and the cycle of operations is complete as far as the keyboard end of the machine is concerned, but the rocking of the selector-wheel sub-frame causes the arm 208 at the back of the machine to move upwardly whereby the lever 202 is rocked to release the shaft 396 which moves the rail 189 forwardly so as to release the trigger on the carriage. The carriage therefore moves rearwardly and rotates the worm 122 carrying the cam 211 which re-sets the lever 202 into latching engagement with the pin 200. The next type-key is now depressed and the whole cycle of operations is repeated.

During this cycle of operations, rotation of the hammer-shaft 217 feeds the paper strip from the container 250 and the rocking of the selector-wheel sub-frame actuates the pawl 249 (Figure 8) to feed the paper strip from the container 242, in a manner hereinbefore described.

The variable return travel of carriage

It will be understood from the foregoing description that the subtlety of the cipher produced by the machine is attributable to the scattering of the cipher-wheels which takes place automatically during the return movement of the carriage, and to the arbitrary and irregular distribution of the gaps 81 in the scatter-drum flanges 80, which latter gives rise to a variable and erratic movement of the typing carriage during the typing run.

If desired, however, yet another factor of subtlety may be introduced by mechanism about to be described, whereby a variable travel is given to the carriage during its return movement.

As shown in Figure 19, certain of the cipher-wheels 109 near the rear end of the machine are formed with cam surfaces 395 which co-operate with tappets 396 carried at the inner end of levers 397 pivoted at 398 to a fixed frame-member 399. The outer end of each lever 397 engages a slot in a vertical spindle 400 which passes through the bottom flange of the channel 276. The spindle is attached to a flat vertical bar 401 the top of which projects through a clearance hole in the top flange of the channel 276 and through the longitudinal rail 116. The bar 401 is normally spring-pressed downwardly by a tension spring 402 anchored to the rectangular frame-bar 106.

During the return movement of the movable carriage the cipher-wheels 109 are rotated intermittently by the intermeshing of their gears 110 with the scatter-gears 83. As each cipher-wheel bearing cam 395 rotates it will be seen that the bar 401 appertaining to it will be moved up and down by the rocking of the lever 397. The top ends of the bars 401 constitute movable stops which, when in their raised position, lie in the path of the downwardly projecting abutment 170 on the tail-portion 177 of the movable carriage so that if one of the movable stops happens to be in its raised position at the instant the abutment 170 approaches it, the return movement of the carriage is arrested. The movable stops are capable of slight tilting longitudinally of the machine and the collision with one of them of the movable carriage causes the longitudinal rail 116 to be shifted forwardly and the same sequence of operations takes place as if the abutment 170 had struck the plate 171. The cipher-wheel-frame is returned to its disengaged position, the scatter-wheel clutch is thrown out and the next typing run of the carriage takes place. Thus the return movement of the carriage is concluded although the carriage may not have reached the front of the machine.

It will be seen that the movable stops have the effect of varying the travel of the return carriage within wide limits. Sometimes the carriage may return the whole length of the machine; at other times it may return only a short distance, and this erratic variation adds enormously to the subtlety of the cipher produced.

The operation of the machine

When it is required to transmit a message the operator inspects the machine, and by reference to the counter 280 ascertains whether or not it is in its zero position. If not, the thumb-plate 267 is pushed rearwardly to disengage the scatter-drum from the worm 122 and the scatter-drum is rotated by means of the hand-crank at the rear end until the counter indicates zero.

The cam-bar 120 is now released by pulling on the screw-threaded pin 173 which moves the rail 116 forwardly and operates the pawl 126 as hereinbefore described.

A setting is now applied to the scatter-drum by pulling the knob 70 forwardly and rotating it and rotating the setting-dials 63 individually in accordance with some pre-arranged code word. The knob 70 is then rotated back and the locking plate 66 let into engagement with the gears 65.

An invisible setting, as has been explained above may have been applied to the scatter-drum, by the operation of moving the setting-dials 63 forwardly, rotating them, and moving them back into mesh with the gears 86.

It will be understood that the two machines, one at the transmitting station and the other at the receiving station, must have their scatter-drums 41 similarly assembled and if desired a lock may be provided whereby the manner in which the drum is assembled is secret even to the operator of the machine.

The operator at the transmitting station now proceeds to type the message on the keys 300, returning the carriage by means of the handle 169 at the completion of each typing run. When the handle 169 is grasped, the lever-system 120, 123, 121 rocks the cipher-wheel sub-frame into engagement with the scatter-drum in which position it remains during the return movement of the carriage. It also engages the scatter-drum clutch and releases the scatter-drum lock. The operation of the handle also feeds the typewriter ribbon through the machine as hereinbefore explained.

During typing, the message in plain language appears on the front paper strip from which the accuracy of the typing operation can be checked. The cipher message is printed on the rear paper strip carried by the movable carriage and is broken up into five letter groups by the mechanism hereinbefore described. This cipher message is transmitted to the receiving station by any method whatsoever, such as radio telegraphy.

If desired the message before or after it has been enciphered by the machine may be coded by means of a standard commercial code so as to reduce the bulk of the matter to be transmitted.

At the receiving station the operator sets up the scatter-drum in exactly the same way as it was set by the operator at the transmitting station. A code word enabling him to do this may, by a suitable process, be transmitted along with the enciphered message. The operator types the enciphered message received on the keys 300 and this message appears on the front paper strip from which the accuracy of the typing can be checked. The message in plain language is printed on the paper strip carried by the movable carriage, and may be read off.

I claim:—

1. A machine of the kind described comprising a sub-frame, cipher-wheels carried thereon, a gear carried by each cipher-wheel, a plurality of scatter-gears rotatable about a fixed axis and means for rocking the cipher-wheel sub-frame into a position in which the cipher-wheel gears may be engaged by the scatter-gears.

2. A machine of the kind described comprising a sub-frame, cipher-wheels carried thereon, a second sub-frame, a selector-wheel carried thereon and movable with respect thereto so as to lie adjacent any one of the cipher-wheels, keyboard mechanism interconnected with the selector-wheel so as to rotate it, means operated by the said keyboard mechanism for rocking the selector-wheel sub-frame into a position in which the selector-wheel meshes with one of the cipher-wheel gears and means to prevent the said rotation from being imparted to the selector-wheel until it is in engagement with a cipher-wheel-gear.

3. A machine of the kind described comprising keyboard mechanism, cipher-wheels selectively rotatable thereby, a selector-wheel driven by said keyboard mechanism and movable by said keyboard mechanism into a position in which it engages one of said cipher-wheels or into a position in which it is disengaged from said cipher-wheels, printing mechanism associated with said cipher-wheels to take an impression from one of them when in its rotated position, means for returning the said cipher-wheel to its original position, means for disengaging the said selector-wheel from the said cipher-wheel and means for preventing such return movement of the cipher-wheel and such disengagement until the printing operation has taken place.

4. A machine of the kind described comprising cipher-wheels, a carriage movable from one position to another, in each of which positions it lies in printing register with a cipher-wheel, a plurality of abutments. trigger mechanism co-operating with said abutments to hold the carriage in a said position, trigger-releasing mechanism to enable it to be moved into another of said positions, printing mechanism carried on the said carriage and adapted to print an impression from the cipher-wheel with which the carriage happens to lie in register, keyboard mechanism and a gear-drive for rotating the said cipher-wheel, means for disestablishing said gear-drive, means for preventing said trigger-releasing mechanism from releasing the said trigger until the said gear-drive has been disestablished and means for preventing the said gear-drive from being disestablished until the said printing operation has been effected.

5. A machine of the kind described comprising a set of cipher-wheels, a sub-frame, a selector-wheel carried on said sub-frame, a keyboard mechanism for rocking the sub-frame into a position in which the selector-wheel makes driving engagement with one of said cipher-wheels, latch-mechanism for retaining the said sub-frame in its position of engagement, and latch-releasing mechanism actuated through lost motion by the upward movement of a typing key so as to release the sub-frame from its position of engagement at the end of the upward travel of a typing key.

6. A machine of the kind described comprising a set of cipher-wheels, a movable carriage capable of moving into printing register with each cipher-wheel, means for impelling the carriage in one direction longitudinally of the cipher-wheel axis during the typing operation, a handle for returning the movable carriage at the end of a typing run, a sub-frame for supporting said cipher-wheels, a scatter-drum comprising scatter-wheels each of which is adapted to co-operate with one of the cipher-wheels, means for rocking the cipher-wheel sub-frame into a position of engagement with the scatter-drum during the return movement of the carriage, which rocking means is interconnected with said handle so as to be automatically actuated at the commencement of the return movement.

7. A machine of the kind described comprising a scatter-drum, a sub-frame, cipher-wheels mounted on the sub-frame, a gear carried by each cipher-wheel, mutilated gears carried by the said scatter-drum and each adapted to co-operate with one of said cipher-wheel gears, detents carried by the said sub-frame and engaging the said cipher-wheels so as to restrain them against idle rotation, means for rocking the sub-frame into a position in which each cipher-wheel gear may be engaged by the teeth of one of the mutilated gears on the scatter-drum, and in which the detents lie on the path of the cams aforesaid so that each cipher-wheel is released whenever teeth on the mutilated gear to which it appertains are presented for engagement by the cipher-wheel gear.

8. A machine of the kind described comprising cipher-wheels mounted on a sub-frame, a selector-wheel sub-frame carrying a longitudinal non-circular shaft, a selector-wheel slidable but non-rotatable on said shaft, keyboard mechanism, means actuated by said keyboard mechanism for rocking the said selector-wheel sub-frame into a position in which the selector-wheel makes driving engagement with one of said cipher-wheels, a detent associated with each cipher-wheel to restrain it against rotation except when engaged by the selector-wheel, a detent-removing member movable in company with the selector-wheel and actuated by said keyboard mechanism to remove the detent when the cipher-wheel is engaged by the selector-wheel and to replace the detent when the selector-wheel is disengaged from the cipher-wheel.

9. A machine of the kind described comprising cipher-wheels, typing keys, a main shaft rotatable by said typing keys, a gear on said shaft, a pinion driven by said gear, a lay-shaft driven by said pinion and carrying the pinion upon it, a selector-wheel carried on said lay-shaft and adapted to enmesh with a cipher-wheel to drive it, a sub-frame carrying said lay-shaft and movable into and out from a position in which the lay-shaft is driven from said gear and in which the selector-wheel engages its cipher-wheel, means for selectively limiting the angle of rotation of said main shaft in accordance with the particular typing key which is struck, means for returning said shaft to its initial position when said key is released, and means for arresting said shaft against a return movement beyond said original position and against rebound from said arrested position.

10. A machine of the kind described comprising cipher-wheels, a sub-frame, a selector-wheel carried by said sub-frame, means for rocking said sub-frame into a position in which the selector-wheel makes driving engagement with one of said cipher-wheels, keyboard mechanism of which each key has a downward movement and an upward return movement, a gear connection between said keyboard and said cipher-wheels for rotating one of said cipher-wheels during the downward movement of a key and returning it during the upward movement thereof, and an interconnection between said keyboard and said sub-frame for rocking said sub-frame during the upward movement of a key out of its position in which the selector-wheel engages one of the cipher-wheels.

11. In a machine of the kind described a scatter-drum comprising a plurality of mutilated annular gears, each gear carrying detent-removing cams arranged in angular relationship with respect to the teeth of the gear, pinion-shafts running longitudinally through the scatter-drum, each pinion-shaft carrying one or more pinions each of which engages with internal teeth on one of said annular gears, and means for rotating said pinions independently of one another.

12. In a machine of the kind described a scatter-drum comprising a plurality of scatter-wheels arranged face to face, a plurality of pinion-shafts each carrying one or more pinions to engage with internal teeth on said scatter-gears, means for rotating said pinion-shafts independently of one another for the purpose of applying a setting to the scatter-drum, and means for locking said pinion-shafts against independent rotation.

13. A machine of the kind described comprising a movable carriage, a gear member carried by said carriage, a co-operating gear-member driven by movement of said carriage, a scatter-drum having a gear adapted to be interengaged with said gear-members during the return movement of the carriage, a lock gear driven by said scatter-drum gear and means for locking said lock gear, and therefore said scatter-drum, against rotation during the typing movement of the carriage.

14. A machine of the kind described comprising a movable carriage, cipher-wheels co-operating therewith, a selector-wheel sub-frame with a selector-wheel carried thereby, a cam-shaft for locking the selector-wheel sub-frame into and out from a position in which it engages one of the cipher-wheels, a series of abutments, a trigger carried by the movable carriage and co-operating with the said abutments so as to lock the movable carriage against movement in one direction, trigger-releasing mechanism operative to remove said trigger from its co-operating position with one of the said abutments and permit the movable carriage to move to the next abutment, and linkage actuated by said cam-shaft for operating said trigger-releasing mechanism upon the movement of the selector-wheel sub-frame out of its engaging position.

15. A machine of the kind described comprising a movable carriage, a gear running longitudinally of the direction of movement of the movable carriage, a gear on the movable carriage to co-operate with the first said gear, trigger-releasing mechanism upon the actuation of which the carriage is moved from one position to another, and resetting mechanism operated by the said gears for arresting the said movement of the movable carriage.

16. A machine of the kind described comprising, in combination a carriage movable lengthwise of the machine, a scatter-drum having its axis arranged lengthwise of the machine, a plurality of flanges carried by the scatter-drum, a projection on the carriage to co-operate with the said flanges, wherein said flanges are formed with gaps arranged in an arbitrary and irregular fashion around them so as to produce an erratic movement of the carriage during its typing run.

17. A machine of the kind described comprising a movable carriage, a set of cipher-wheels, a sub-frame carrying said cipher-wheels, a handle rotatable on said movable carriage, a cam-bar to engage said sub-frame so as to rock it, a lever interconnecting said handle with said cam-bar when the carriage is at the end of its typing movement so that actuation of the said handle rocks the cipher-wheel sub-frame.

18. A machine of the kind described, comprising a plurality of cipher-wheels rotatable about a common axis, a carriage movable in a direction parallel with said axis into successive positions of register with said cipher-wheels, printing mechanism cooperating with the said cipher-wheels, typing keys to rotate said cipher-wheels selectively and to permit stepwise movement of the said carriage on its typing run, means for producing inequality between the length of one such step and another, and locking means engaged by the movable carriage at the end of its typing run, to lock the keys against further movement until the movable carriage has been moved to execute its return movement.

19. A machine of the kind described, comprising keyboard mechanism, a plurality of cipher-wheels rotatable about a common axis, a carriage movable under the control of said keyboard in a direction parallel with said axis so as to register successively with a different cipher-wheel at each actuation of said keyboard, means for returning said carriage, and means for automatically varying the travel of said return movement.

20. A machine of the kind described comprising a plurality of cipher-wheels, a carriage movable with respect thereto, gearing to rotate said cipher-wheels by varying extents when said carriage executes its return movement, an abutment carried by said carriage, cams carried by said cipher-wheels and dogs actuated by said cams so as to be protruded into and out from the path of said abutment.

MORGAN CYPRIAN McMAHON O'BRIEN.